(12) United States Patent
Zernov et al.

(10) Patent No.: US 6,262,761 B1
(45) Date of Patent: Jul. 17, 2001

(54) SUBMERSIBLE VIDEO VIEWING SYSTEM

(75) Inventors: Jeffrey P. Zernov, Baxter; Anthony L. Capra, Minneapolis, both of MN (US)

(73) Assignee: Nature Vision, Inc., Brainerd, MN (US)

( * ) Notice: Subject to any disclaimer, the term of this patent is extended or adjusted under 35 U.S.C. 154(b) by 0 days.

(21) Appl. No.: 09/611,261

(22) Filed: Jul. 6, 2000

Related U.S. Application Data

(63) Continuation-in-part of application No. 29/119,957, filed on Mar. 10, 2000, application No. 29/116,362, filed on Dec. 30, 1999, and application No. 09/186,593, filed on Nov. 5, 1998, now Pat. No. 6,097,424.

(51) Int. Cl.[7] .............................. H04N 7/18; H04N 9/47
(52) U.S. Cl. .............................................. 348/81; 348/61
(58) Field of Search ........................... 348/81–82, 84–85, 348/373, 374, 376, 61; 396/25–26, 28; 206/316.2

(56) References Cited

U.S. PATENT DOCUMENTS

| | | | | |
|---|---|---|---|---|
| 3,017,817 | * | 1/1962 | Sampson | 396/25 |
| 3,261,274 | * | 7/1966 | Smith | 396/25 |
| 3,832,725 | * | 8/1974 | Cook | 396/27 |
| 4,184,758 | * | 1/1980 | Winnacker | 396/25 |
| 4,777,501 | * | 10/1988 | Caimi et al. | 396/28 |
| 4,860,038 | * | 8/1989 | Thatcher et al. | 396/25 |
| 5,089,895 | * | 2/1992 | Fraker et al. | 348/373 |
| 5,669,020 | * | 9/1997 | Hopmeyer | 396/27 |
| 5,778,259 | * | 7/1998 | Rink | 396/27 |
| 6,097,424 | * | 8/2000 | Zernov et al. | 348/81 |

* cited by examiner

Primary Examiner—Vu Le
(74) Attorney, Agent, or Firm—DL Tschida

(57) ABSTRACT

A modular, submersible video viewing system. The system includes a viewing monitor, camera and interconnecting multi-conductor cable that store at a portable housing and deploy for underwater viewing. Webs at the camera housing interconnect to cable clips, bottom support plates, a swivel coupler or steering guide and/or pole to control camera orientation when towed or during stationary or pole directed viewing. Alternative rudders and/or hydrodynamic ballast weights (with or without a keel) mount to the webs to control camera tracking. A multi-aperture reflection suppressor and etched lens mount to the camera and cooperate with a series of LED's to direct light relative to the viewing field of the camera lens. Various sunshields, lights and/or lenses and filters are optionally mountable to the monitor housing or camera. Alternative monitor housings are disclosed that contain the viewing monitor, battery and attendant control circuitry and camera. Handles, cable wraps, cable take-up spools and integral and detachable sunshields are also disclosed. A video storage/re-play feature and combinations of switched multi-frequency lights are also included.

26 Claims, 30 Drawing Sheets

SUBMERSIBLE VIDEO VIEWING SYSTEM

This is a continuation-in-part of application Ser. No. 29/119,957, filed Mar. 10, 2000; application Ser. No. 29/116,362, filed Dec. 30, 1999; and application Ser. No. 09/186,593, filed Nov. 05, 1998 now U.S. Pat. No. 6,097,424.

BACKGROUND OF THE INVENTION

The present invention relates to portable underwater viewing systems and, in particular, a number of alternative systems including camera assemblies with improved camera tracking and enhanced light distribution and portable monitor housings with improved cable take-up capabilities, re-playable viewing and detachable sunshields.

Varieties of sonar depth indicators and fish-finders have been developed to assist fresh and saltwater fisherman. These devices monitor solid objects that are encompassed in a column of water included in the paths of transmitted and reflected signals relative to the bottom of a body of water. The objects are displayed at surface monitors as flashes of light, marks on a paper graph or indicia at a screen of a CRT, LCD or other electronic display.

Depending upon device capabilities, sonar equipment will detect and display fish, debris, flotsam, thermo clines, and bottom structure and hardness, among other physical parameters of possible interest. The utility of any device, however, is dependent upon the operator's ability to distinguish and interpret displayed indicia. Electronic circuitry can be included to assist in the display of data. For example, a fish symbol can be displayed after passing received signals through a comparator circuit having a threshold level indicative of a fish. A variety of other automatic detection, interpretation and presentation circuitry for other parameters of interest can also be designed into each monitoring system.

Sophisticated, real time underwater video systems have also been developed for use in deepwater exploration. This equipment is very costly and is typically used by oil companies, archaeologists, researchers and salvage operators. However, it provides a true video image of encountered objects, fish etc.

Less sophisticated video systems have also been developed for sport fishing applications. These systems include submersible black and white or color cameras, a surface monitor and a signal cable that shrouds necessary power and optical conductors. Camera support assemblies are also available that accept a rudder or pole. Mounts are also available for attaching lights to the sides of the camera. Some systems provide audio capabilities.

Existing systems are generally configured around "off the shelf" components. Consequently, operating performance can suffer from an inability to maintain a known and constant attitude and orientation of the camera to a support watercraft. Sunlight can affect viewing at the monitor screen. Reflections from camera mounted lights and diffused light in the water can produce reflections that degrade the clarity of the transmitted and/or received video. Heat from associated lights can also affect camera longevity. Cord and component storage and deployment can also be cumbersome.

The present system was developed to provide a modular collection of components that are combined to overcome problems of component storage, moisture contamination at the camera, monitor viewing, and hydrodynamic tracking of the camera relative to boat or pole movement. A number of alternative monitor housings contain and protect the viewing monitor and store attendant support and control equipment, such as a battery power supply and control circuitry, cabling and the camera and attachments. Hand operated cable take-up spools are integrated into the housings. Integral and detachable sunshields improve viewing under a variety of light conditions. The monitor housings can be supported on a boat deck, a pivot bracket at the boat or housing.

The camera includes a number of internal light sources. A reflection suppressor/diffuser and tailored lenses or lens covers having anti-reflective coatings, shaped curvatures, bi-focal surfaces or etched or raised patterns are fitted to the camera housing to control the lighting relative to the camera lens. The camera housing is filled with a desiccant. Webs at the camera housing accept a variety of accessories, for example, rudders, ballast's, attitude controls, mounting clips, filters, external lights and/or other cameras. The cable core is filled with foam and other materials to prevent the migration of moisture and self-heal if abraded.

SUMMARY OF THE INVENTION

It is a primary object of the invention to provide a modular, submersible, video viewing system.

It is a further object of the invention to provide a portable monitor housing that contains a viewing monitor, necessary audio and video controls and that stores the camera, cable and all system accessories for ready deployment.

It is a further object of the invention to provide a monitor housing having an integral handle, a shrouded sun shield, and a pivot bracket that permits operator viewing from seated or upright positions.

It is a further object of the invention to provide a monitor housing that contains a battery supply, an external power converter and/or AC/DC power monitor, audio speakers, camera and monitor controls, and storage space for system attachments and accessories.

It is a further object of the invention to provide a rubber-coated camera having concentrically arranged infrared (IR), infra-blue (IB) and/or infra-green (IG) lights, a sealed desiccant, a protruding bumper ring and a coated, etched or shaped lens and/or lens cover to enhance viewing and/or reduce reflections, refraction and internal heat buildup.

It is a further object of the invention to provide a camera housing that is compatible with accessory lenses, light filters, ballast weights, hydrodynamic rudders and keels, attitude controls, a pole and/or stationary viewing supports.

It is a further object of the invention to provide a video system that can accommodate multiple cameras to provide forward and back viewing and/or an expanded field of view.

It is a further object of the invention to provide a moisture, sealed, self-healing cable that includes a number of power and signal conductors, a fiber core that prevents stretching, and/or means for dynamically controlling cable and camera orientation.

It is a further object of the invention to provide a viewing monitor housing having a hand-operated or motorized cable take-up spool to facilitate cable retrieval and deployment.

It is a further object of the invention to provide a take-up spool including slip ring couplings to the cable conductors.

It is a further object of the invention to provide a multi-section ballast and variety of hydrodynamic rudders/keels that facilitate camera tracking during forward or back viewing.

It is a further object of the invention to provide a cable clip to facilitate camera attachment to a weighted downrigger cable.

It is a further object of the invention to provide a light diffuser/reflection suppressor light ring that aligns to internal illumination sources at the camera.

It is a further object of the invention to provide a camera with a lens cover having etched or raised surfaces to control emitted light.

It is a further object of the invention to provide video storage circuitry for storing a predetermined number of frames of images for convenient re-play.

It is a further object of the invention to provide a number of portable viewing systems containing alternative monitor housings, cable take-up assemblies and sunshields.

The foregoing objects, advantages and distinctions of the invention, among others, are obtained in a number of alternative configurations of presently preferred viewing systems. In a first construction, a viewing monitor and system accessories are stored in multiple compartments of a carry case. A spool mounts around the case and stores a system cable. A fabric shroud or sunscreen can be fitted to the monitor.

In another construction, a portable housing is formed to permanently support the viewing monitor, attendant power supply and control circuitry to permit viewing through a shrouded or sun screened viewing space. The housing includes a handle, cable wraps, a camera storage cavity, and recessed input and output controls. The housing can be supported from the ground or a pivoting mounting bracket.

A number of other alternative viewing monitor housings are also disclosed that provide hand and motor operated cable take-up spools. Slip ring connections are provided at the spools to the conductors of a wound video cable.

The cable supports multiple conductors and a KEVLAR core in a foam filled jacket that prevents moisture transmission to the camera. A moisture-activated filler included in the cable jacket self-heals the jacket against punctures and abrasions. Hydrodynamic vanes can be attached to the cable jacket and/or the cable jacket can be constructed to facilitate cable movement with minimal lift at the camera.

The camera is packaged in a rubber housing that contains a desiccant material. The camera housing may be purged with a rare earth gas. A number of lights are concentrically mounted within and/or around the camera housing. A bifocal lens or lens cover coated with an anti-reflective material can be fitted to the camera to direct IR light and reduce external glare and internal reflections. One or more lenses or filters can be mounted to the camera and/or a servo-controlled mount to rotate the filters and/or a desired lens into alignment with the primary lens. A piezoelectric cooler can be fitted to the housing to cool the camera circuitry. External lights and a variety of sensors, such as for monitoring depth, temperature, pH, oxygen ($O_2$) and/or audio, can be mounted to the camera.

Bored webs project from the camera housing and selectively support rudders, keels, ballast weights, a pole attachment, clip fasteners and stationary supports to control the camera orientation to the cable and/or lake bottom. A multi-section hydrodynamic ballast is also disclosed that mounts to the camera along with a number of alternative hydrodynamic rudders and keels that enable forward and back viewing.

Additional lights and a variety of other fittings, accessories and servo-controls can also be mounted to the camera. A detachable camera clip facilitates attachment of a back viewing camera to a downrigger cable and suspended ballast.

Reflections from internal lights are suppressed with a multi-apertured ring that aligns with the lights. Oblong tapered bores of the ring direct light relative to the camera lens. Video storage circuitry can be included at a monitor housing to capture video images for replay.

Electrical or radio frequency (RF) controllers can be combined with appurtenant servo-controls to control monitor functions, such as switching between included functions. Other servo-controls mounted to the cable or signals directed from the cable can control camera attitude, lens and/or filter configurations. A bottom tracking transducer and servo can dynamically control the camera elevation to prevent snagging or damage from dragging.

Still other objects, advantages, distinctions and constructions of the invention will become more apparent from the following description with respect to the appended drawings. Similar components and assemblies are referred to in the various drawings with similar alphanumeric reference characters. The description should not be literally construed in limitation of the invention. Rather, the invention should be interpreted within the broad scope of the further appended claims.

DESCRIPTION OF THE PREFERRED EMBODIMENT

Figure 1:
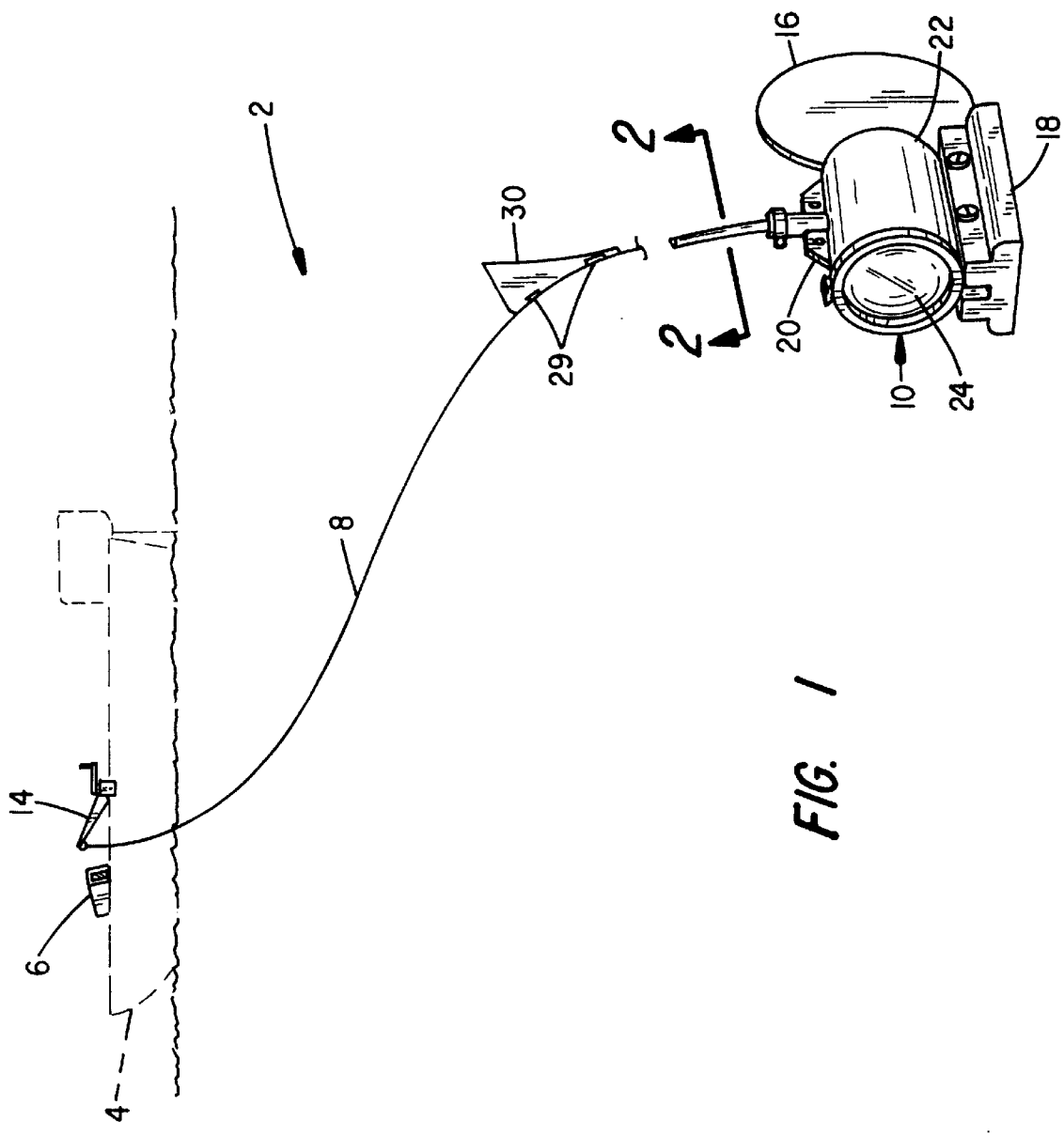
FIG. 1 is a diagram of a typical arrangement of the viewing system when towed behind a watercraft.

Referring to FIG. 1, a submersible video viewing system 2 is shown as it appears when configured for operation from a watercraft or boat 4. A viewing monitor 6 is supported at the boat 4 and a coaxial cable 8 is tethered to a submerged camera 10. A pair of conductors 12, reference FIG. 2, supply power and/or control signals to the camera 10. Additional conductors may be included in the cable 8.

Video, audio and/or other control and/or sensed signals are transmitted over the conductors 12 between the camera 10, the monitor 6 and associated control circuitry. A boat operator is thereby able to visually monitor the presence of fish, submerged objects or any condition capable of being detected and reported by associated sensors. The viewing range will depend on water clarity, depth and light conditions, among other factors. Surface turbulence, drag and tracking at the camera 10 may also affect viewing. Other physical parameters may also be monitored by the camera 10 and associated sensors mounted to the camera.

The relative position of the camera 10 to the boat 4 is principally determined by the speed of the boat 4 and the drag of the cable 8 and camera 10. Preferably, a relatively slow speed (e.g. drifting to 2 mph) is maintained to better control the viewing position of the camera 10. The length of cable 8 trailed from the boat 4 will depend upon the cable thickness, cable hydrodynamics, camera hydrodynamics and the weight at the camera 10. The cable 8 can be deployed by hand, such as from a hand spool 64 or handles 94, reference FIGS. 13 and 14.

Figure 16:
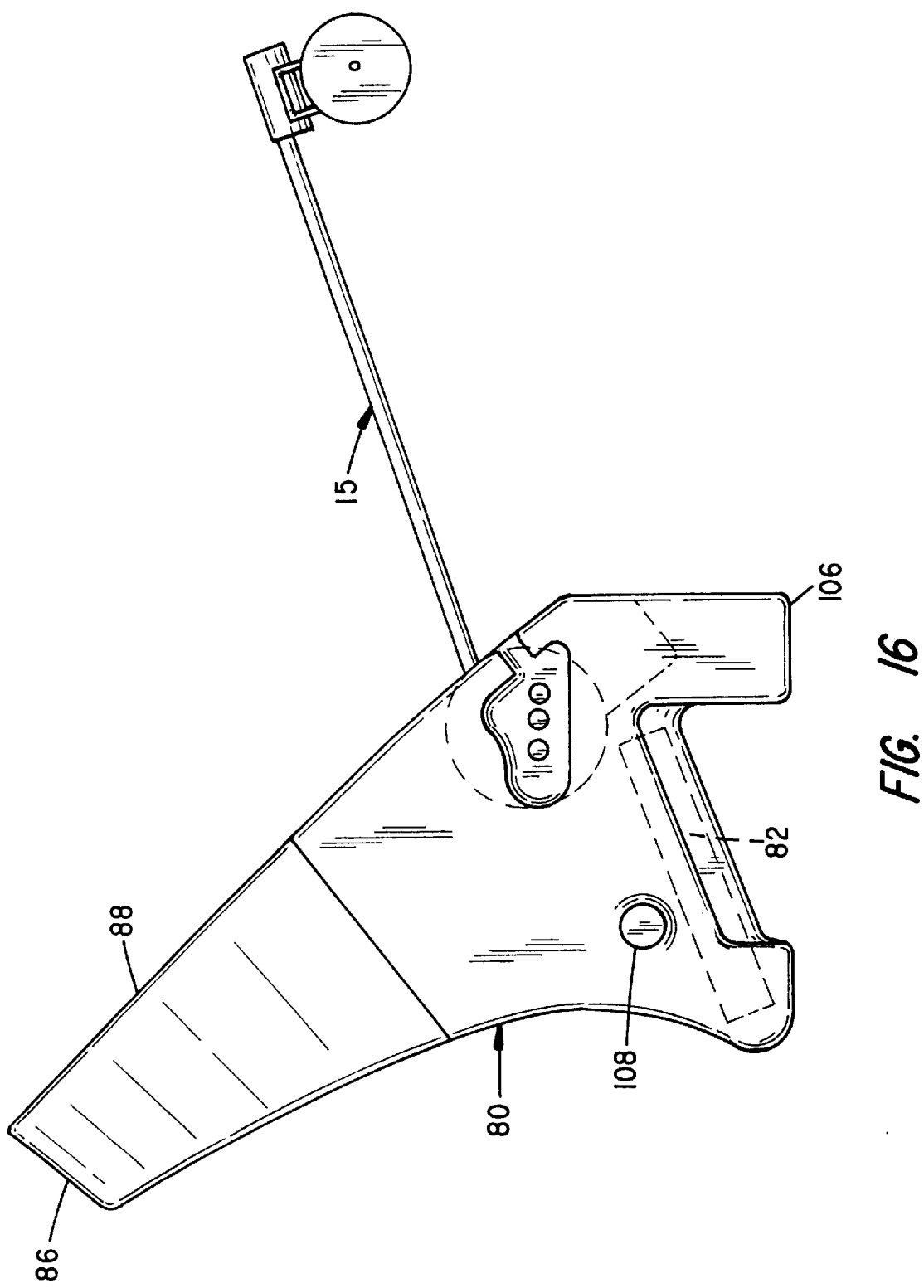
FIG. 16 is a perspective view of a portable monitor housing that includes a cable deployment boom.
Figure 19:
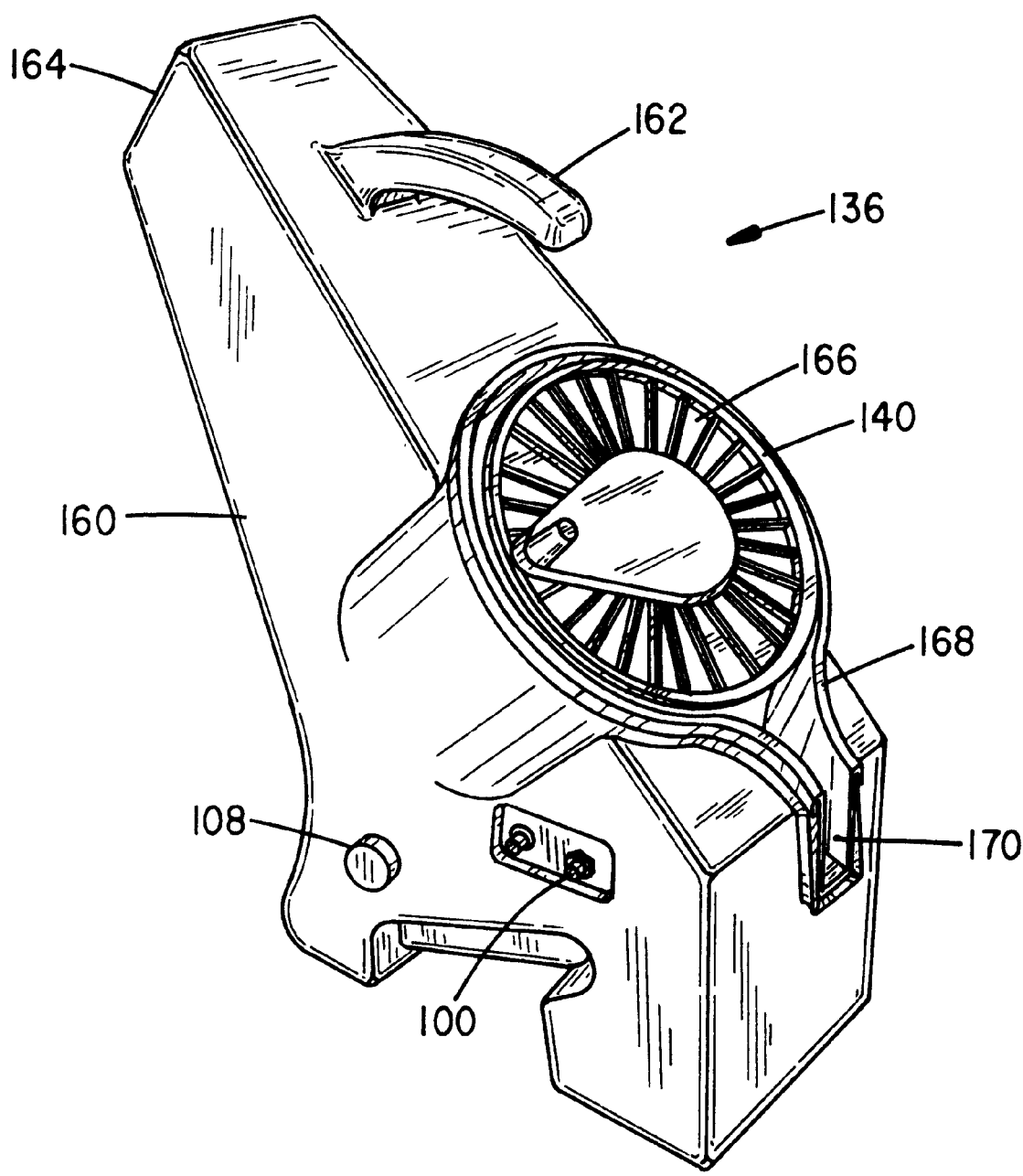
FIG. 19 is a perspective view of a portable monitor housing having a hand-cranked, cable take-up spool and wherein slip rings couple cable terminations at the spool to the housing circuitry.
Figure 20:
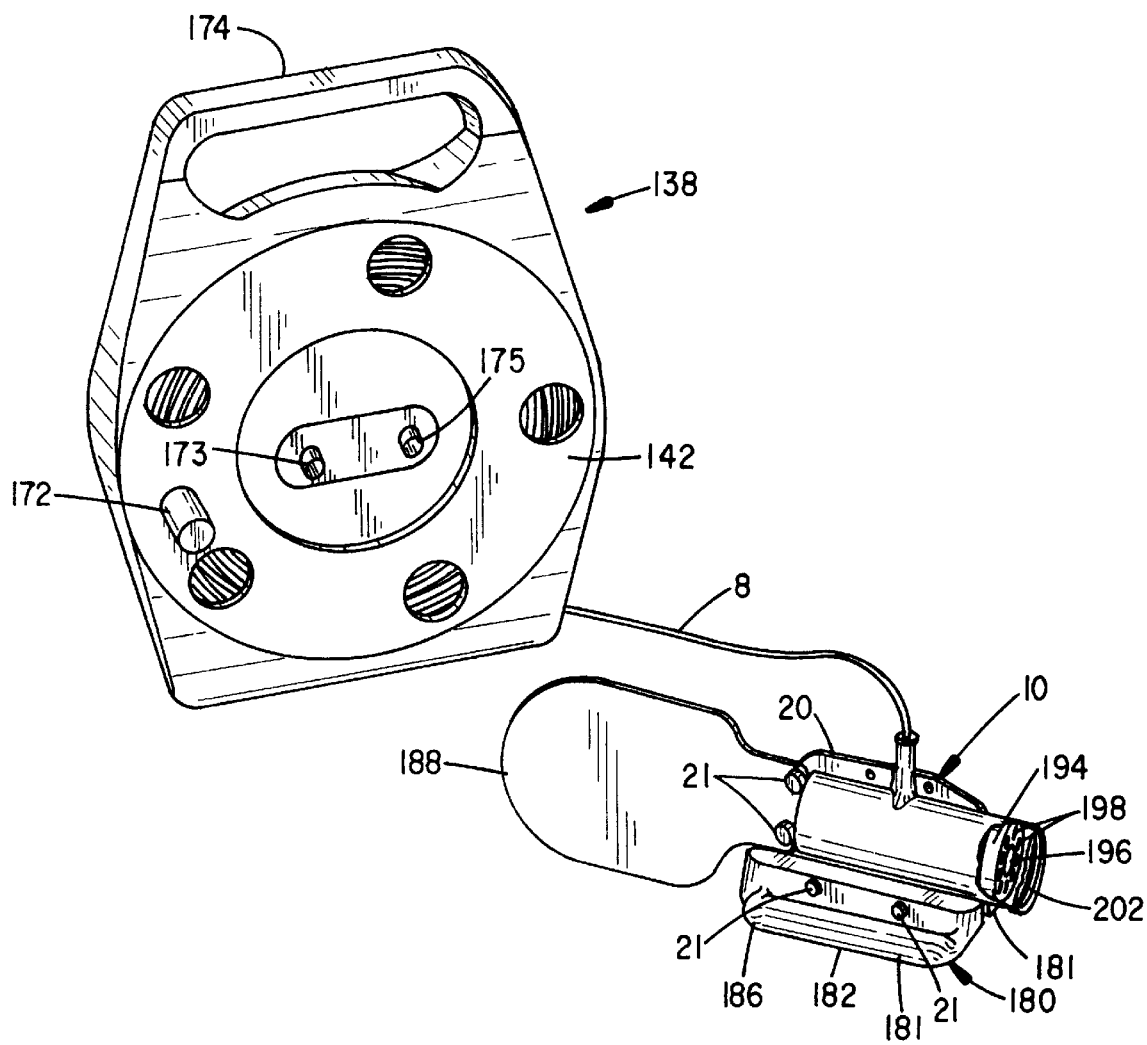
FIG. 20 is a perspective view shown in exploded assembly to another portable hand-cranked, cable take-up spool and camera.

A manual or powered take-up, boom assembly 14, similar to a conventional downrigger, can be fitted to the boat 4 to release and retrieve the cable 8. The assembly 14 improves operator control over the cable 8 when operating at depths greater than 100feet or over bottoms with severe elevation changes. Servo controls can cooperate with the assembly 14 to sense camera depth relative to the bottom to maintain a desired position. Alternatively, FIG. 16 shows a motorized boom assembly 15 and end-pulley 17 fitted to an improved monitor housing 80 that is discussed in detail below. The drive motor (not shown) is mounted in the housing 80. FIGS. 19 and 20 disclose other camera housings 136 and 138 with integral hand-cranked take-up spools.

Figure 2:
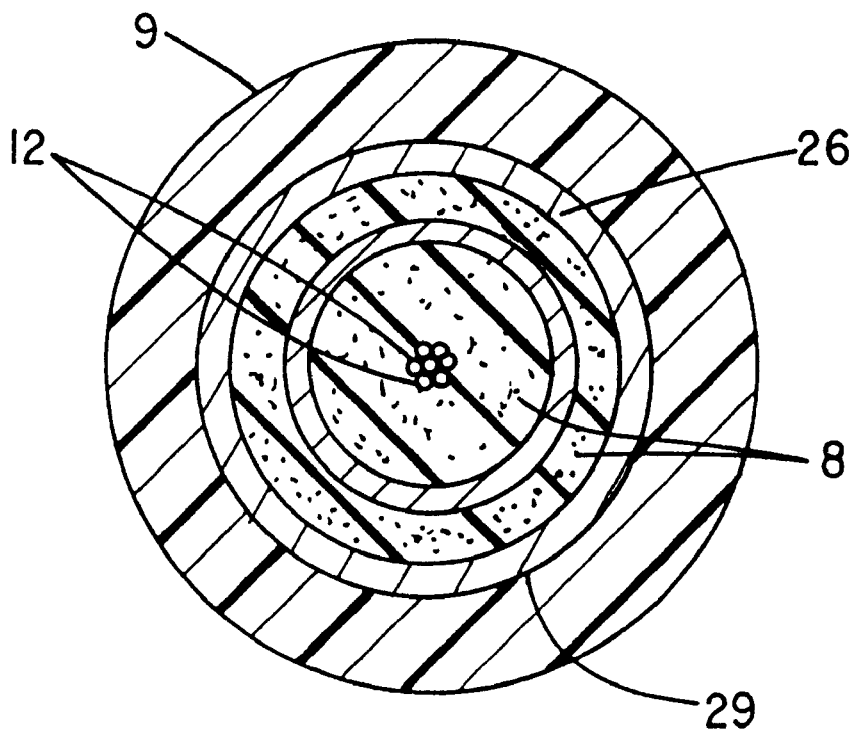
FIG. 2 is a cross-section drawing through the cable.

With attention to FIG. 2, the cable 8 presently has a nominal diameter of 0.150 inches. A thermoplastic jacket or cover 9 contains three conductors 12, a stranded KEVLAR cord 26 and foam filler 28. One-foot markings are provided on the outer cover 9 to provide a reference in the deployment of the cable 8. A water blocking gel material 29 is contained in the cable 8 that self-heals the cable 8. Upon exposure to moisture, the material 29 expands to fill any nicks or abrasions to the cover 9 and prevent the migration of moisture through the cable 8 and into the camera 10. A variety of other types of cables might also be used. The number of conductors 12 can be varied depending upon the configuration of the camera 10 and/or available sensors or servos mounted along the cable 8 or at the camera 10.

Figure 3:
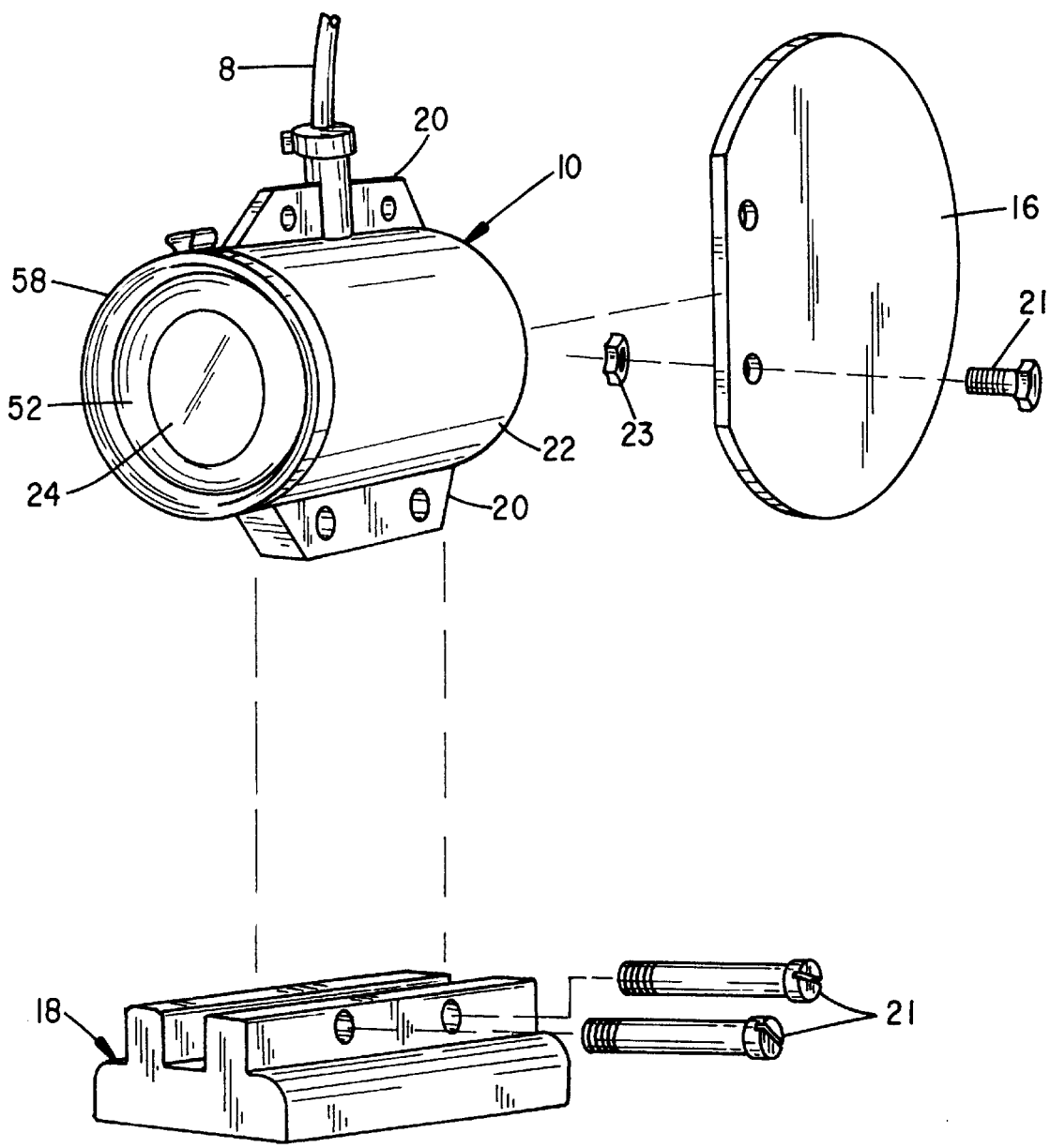
FIG. 3 is an exploded assembly drawing to the camera, ballast and rudder and wherein the camera is shown in partial section.
Figure 4:
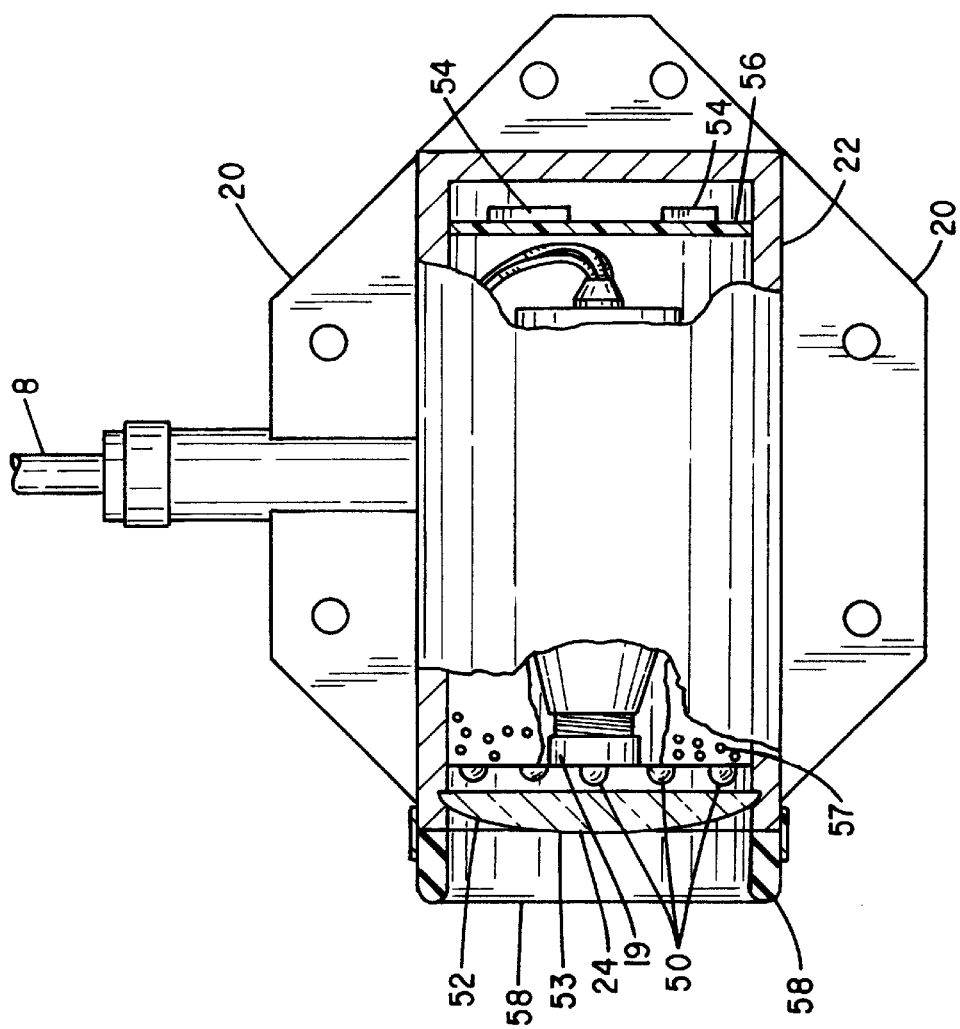
FIG. 4 is a partial cross section drawing through the camera.
Figure 5:
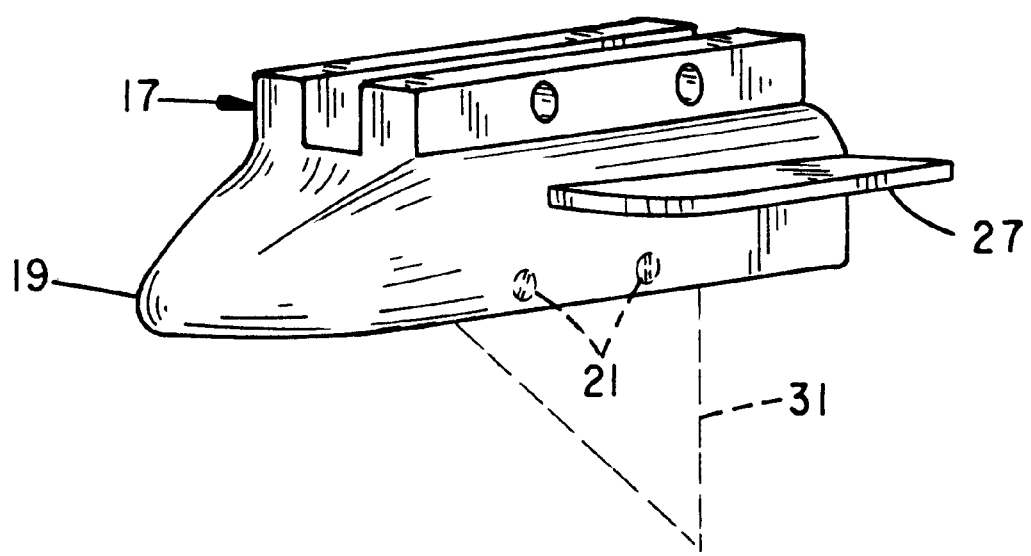
FIG. 5 is a perspective drawing to a hydrodynamic ballast weight.

With additional attention to FIGS. 3, 4 and 5, a relatively constant orientation of the camera 10 is obtained with a rudder 16 and a ballast weight 18. Normally, the camera 10 is towed with an external lens or lens cover 24 facing forward. An internal camera lens 19 is centered to and spaced away from the lens 24. The camera 10 can also be towed facing backward. The ballast weight 16 is supported to one of a number of flexible webs 20 that radiate from a rubberized housing or cover 22 at the camera 10. Bolt and/or nut fasteners 21 and 23 secure the rudder 16 and ballast weight 18 to the camera 10.

The ballast weight 18 stabilizes the camera 10 and adds weight to minimize the length of cable 8 that must be deployed. The shape of the ballast 18 is formed to stabilize and control the hydrodynamic movements of the camera 10. It is preferable to minimize the length of cable 8 that is deployed to facilitate camera control. A relatively heavy ballast weight 18 provides a generally vertical presentation at slow boat speeds. The amount of ballast weight 18 can be varied to offset the drag of the cable 8 and camera 10. A ballast weight in the range of 1 to 10 pounds is believed sufficient for the present system 2, when used in freshwater.

Figure 21:
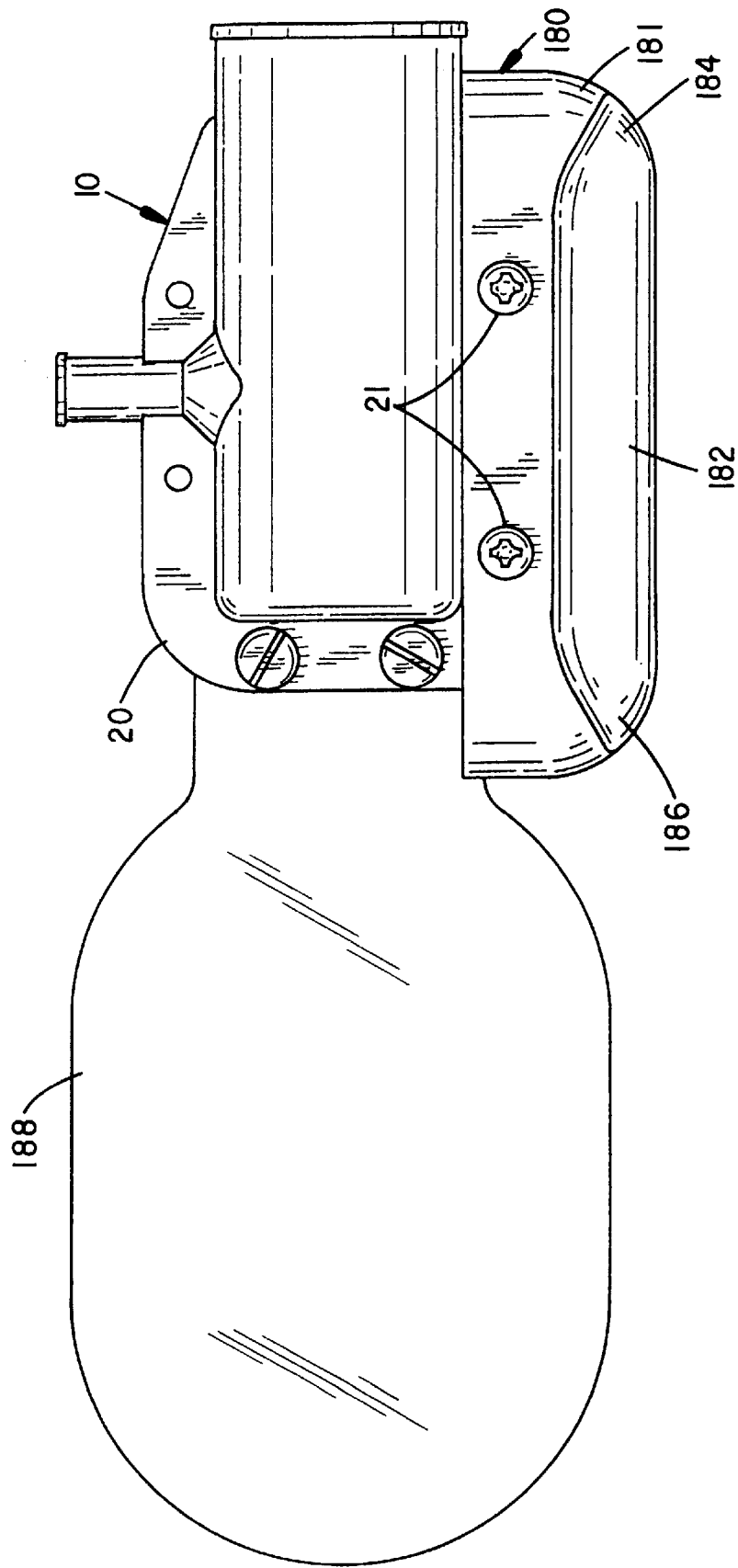
FIG. 21 is a plan view to a second configuration of a forward viewing camera, ballast and tracking fin.

The rudder 16 is also secured to the aft web 20 of the camera 10 with fasteners 21 and 23. The shape of the rudder 16 can be varied as desired. Presently, the rudder 16 is constructed from a Plexiglas material. The rudder 16 can be constructed to a variety of shapes from a variety of materials, see also FIGS. 21 and 22 and the related discussion to a multi-section ballast and rudders with different shapes. The rudder 16 may include additional sections that are hinged to pivot relative to each other. The rudder 16 stabilizes the camera tracking and minimizes wobble or rotation. The resiliency of the web 20 also facilitates rudder movement and camera tracking by accommodating some side currents. The rudder 16 can also be outfitted with a servo-controller (not shown) to change the rudder angle relative to the rudder 16 to better steer the camera 10.

Figure 23:
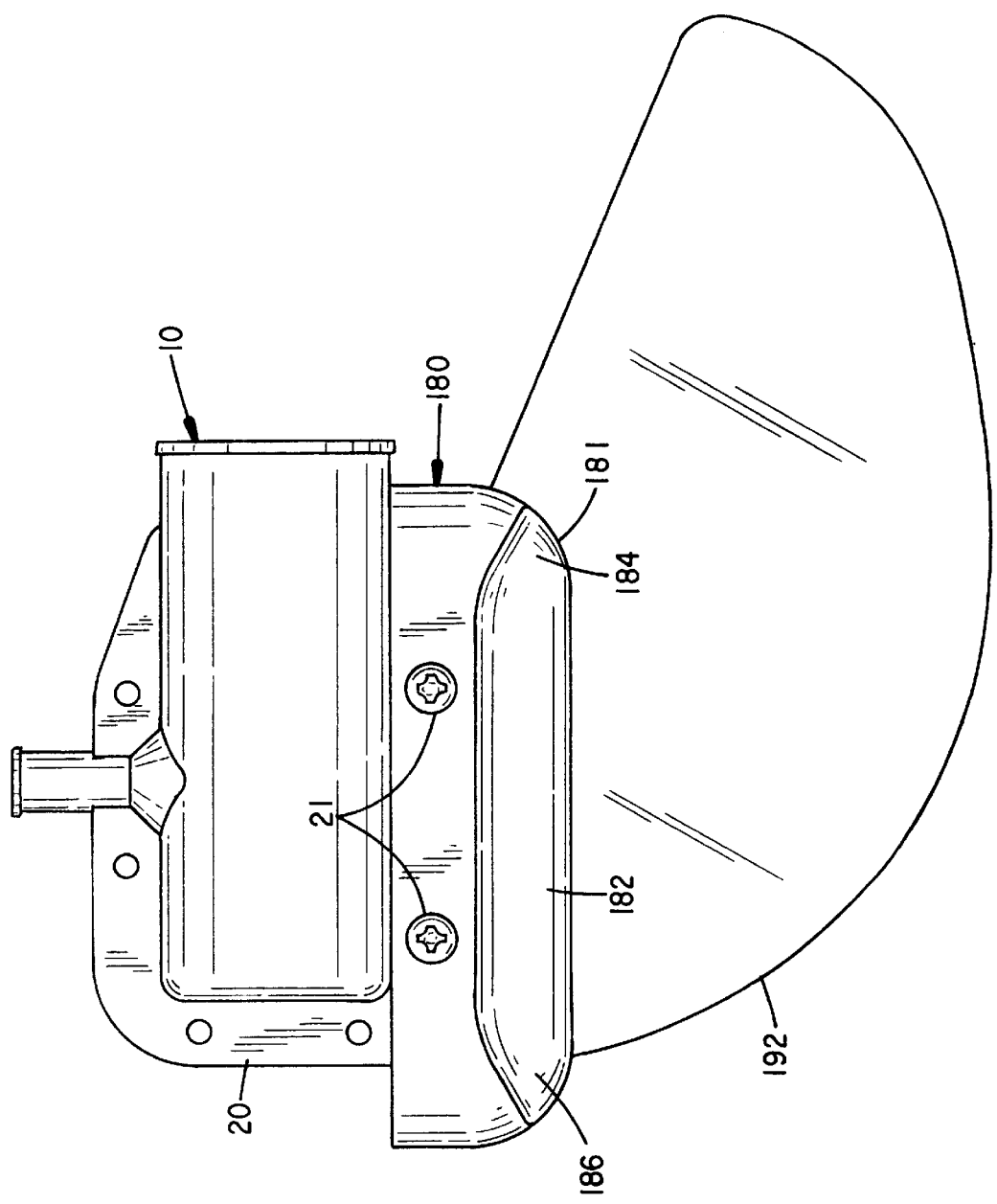
FIG. 23 is a plan view to fourth configuration of a camera mounted to a ballast and keel to support back viewing.

FIG. 5 shows a ballast 17 that can be used in lieu of the ballast 18. The ballast 17 has a bulbous nose 19 and right and left side planing wings 27. The nose 19 and wings 27 improve the hydrodynamic tracking properties of the ballast 17 and camera 10. A keel 31 (shown in dashed line) can also be mounted to the ballast 17 with fasteners 21. The keel 31, versus the rudder 16, finds application when a rear-facing camera configuration is assembled (e.g. a single rear pointed camera 10 or separate fore and aft pointed cameras 10). FIG. 23 shows another keel fitted to a multi-section ballast.

Strain and stretching of the conductors 12, due to the ballasts 17 or 18 and normal towing, is prevented via the KEVLAR cord or braiding 26 that is contained in the cable 8. Vanes 30 having a variety of hydrodynamic shapes can also be attached to the cable 8 with clips 29 to maintain camera orientation and reduce cable drag and cable tension. The vanes 30 can also be molded into the cable cover 9. One or more servo-controlled or steer able vanes 30 might also be mounted to the cable 8 to prevent/minimize cable twisting and provide steady camera tracking.

Figure 6:
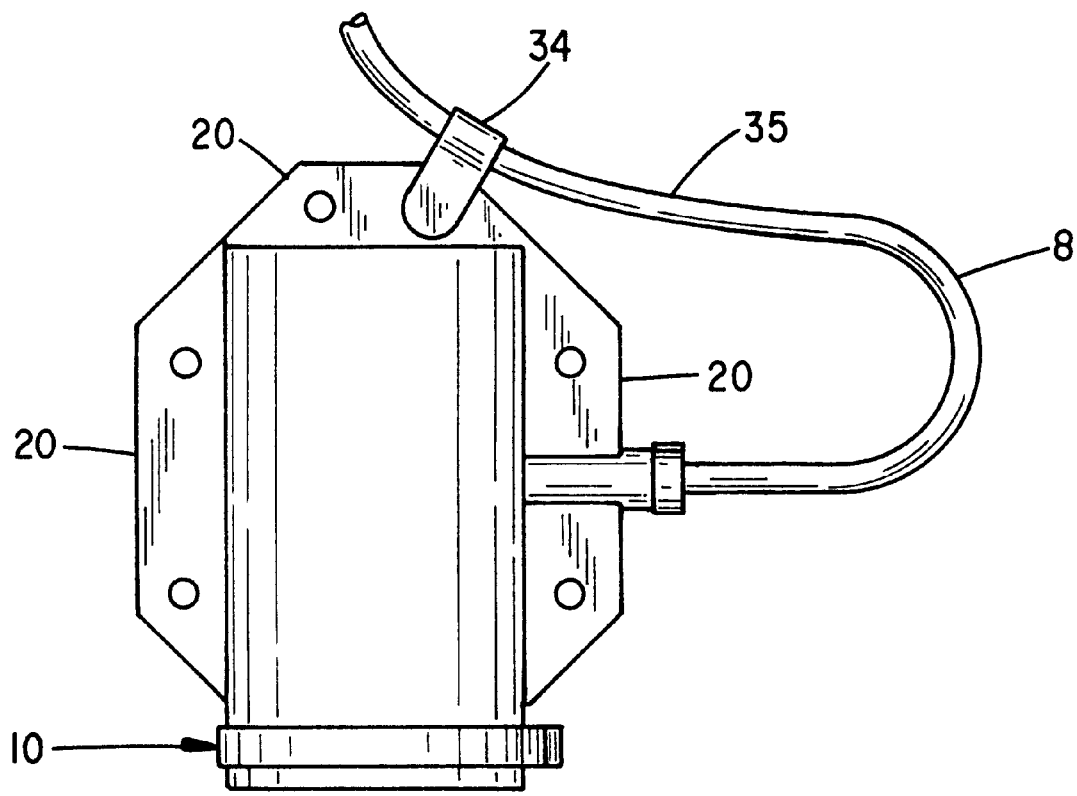
FIG. 6 is a plan view to the camera rigged for vertical viewing.

In addition to being towed by a boat, the viewing system 2 can be used in a variety of other applications. FIGS. 6 through 10 depict alternative mountings of the camera to accommodate some of these applications. FIG. 6 shows the camera 10 suspended in a vertical orientation with the lens 24 pointed down to permit bottom viewing. A clip 34 secures a loop 35 of the cable 8 to the aft web 20. The weight of the camera 10 is thereby distributed to tip the lens 24 to a desired angle.

Figure 7:
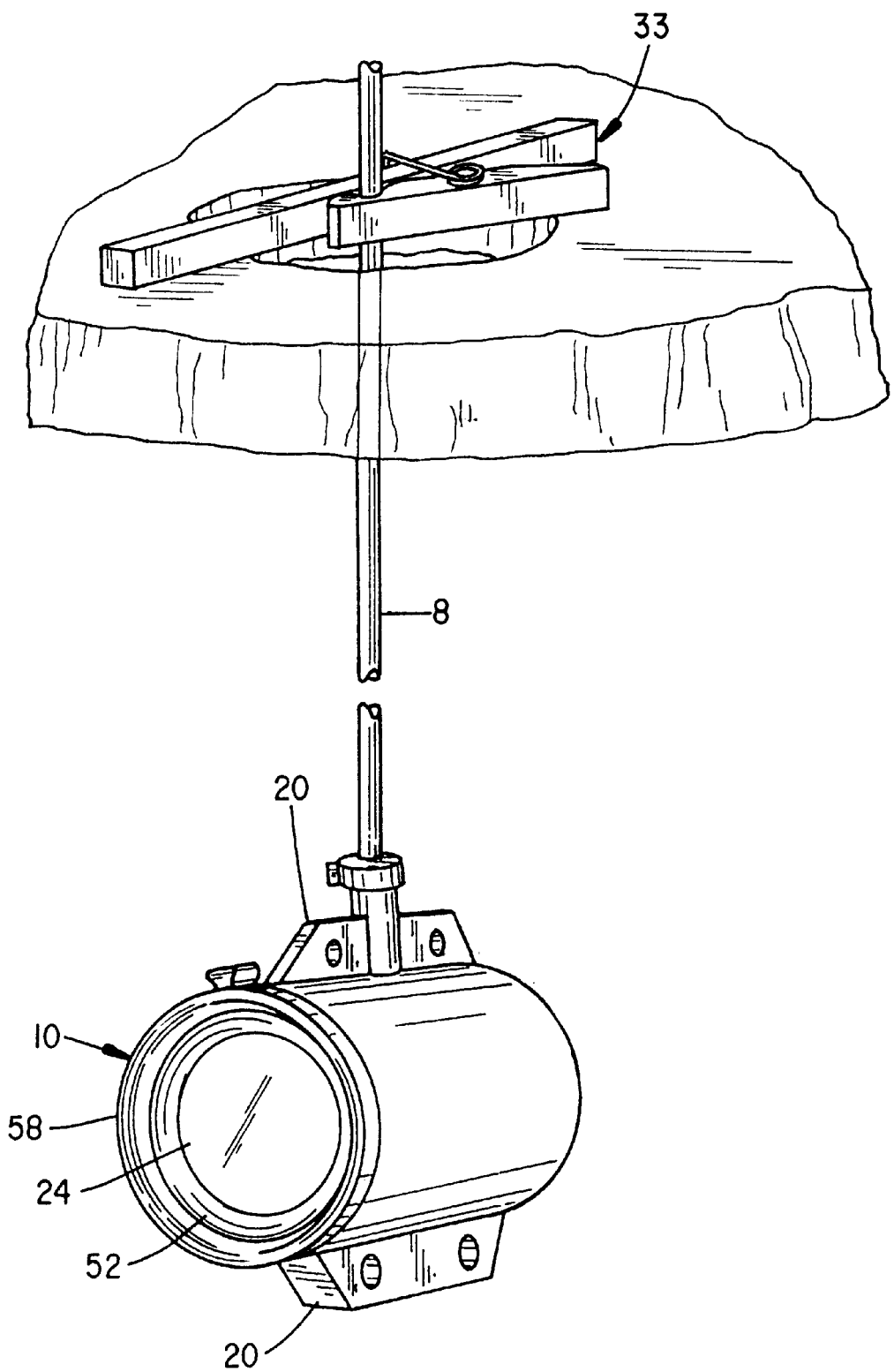
FIG. 7 is a perspective view of a camera suspended from an ice hole.
Figure 8:
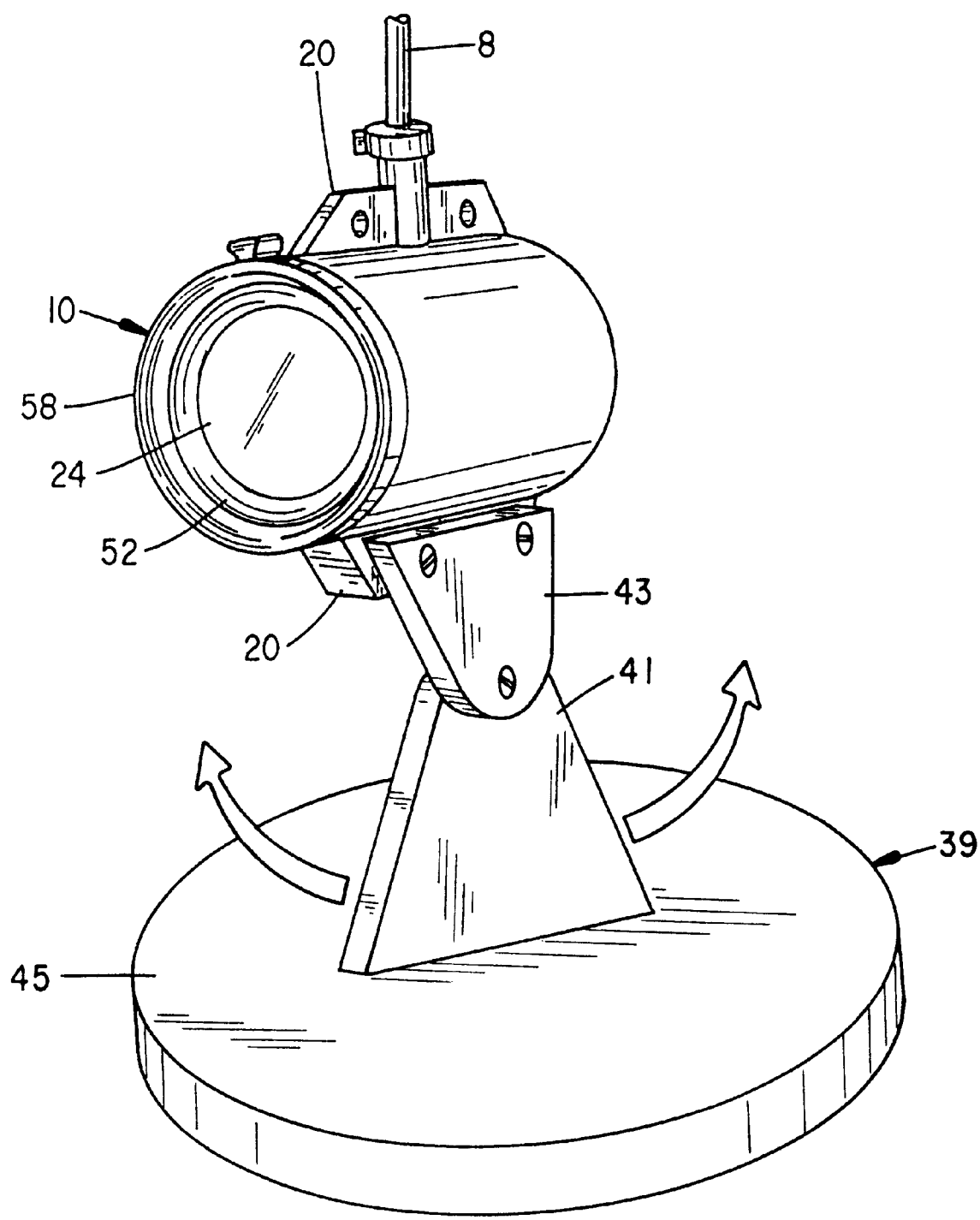
FIG. 8 is a perspective view of a weighted, adjustable stationary support that supports the camera at a selected orientation to a lake bottom.
Figure 9:
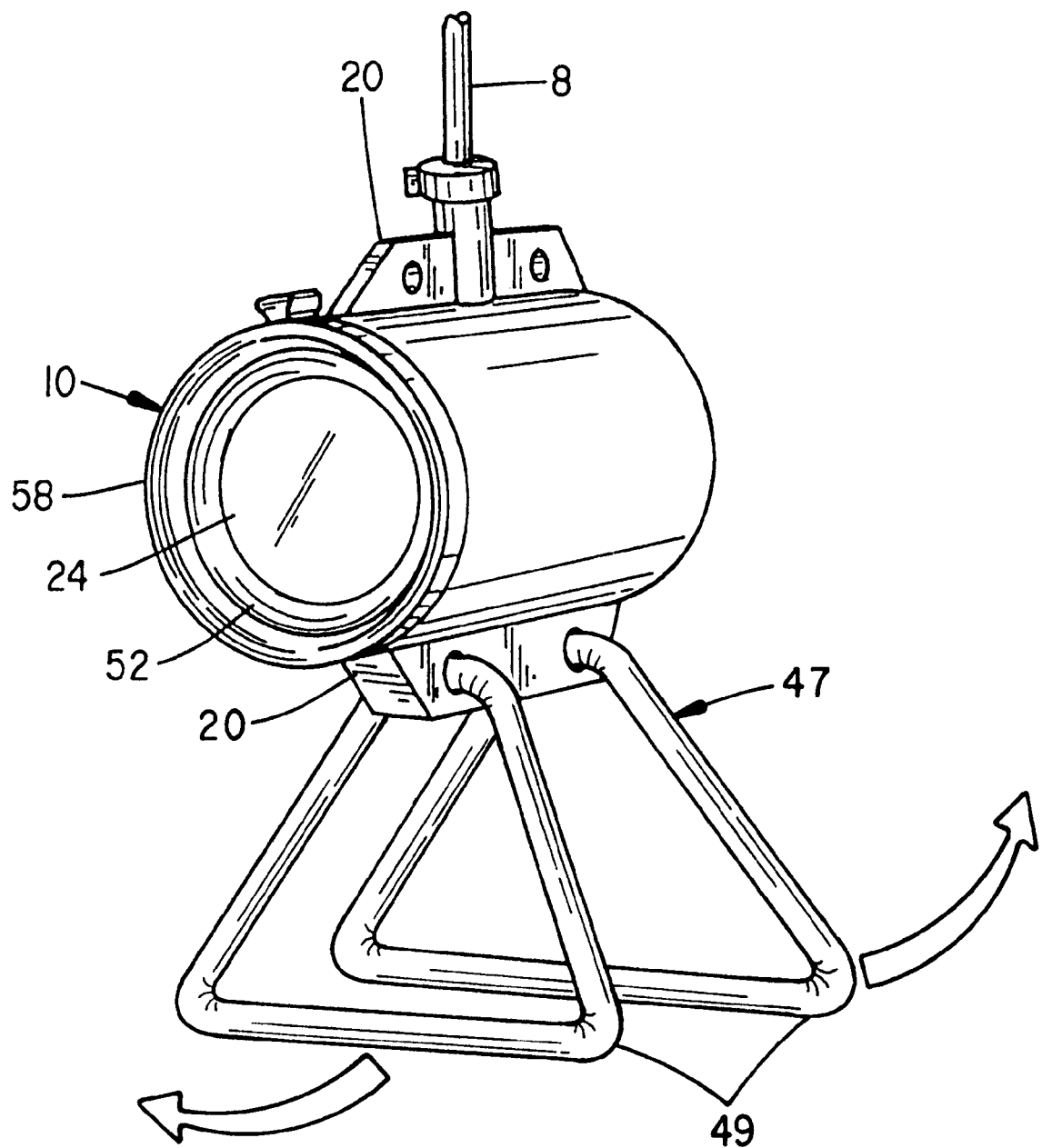
FIG. 9 is a perspective view of a wire formed, adjustable stationary support that supports the camera at a selected orientation to a lake bottom.
Figure 24:
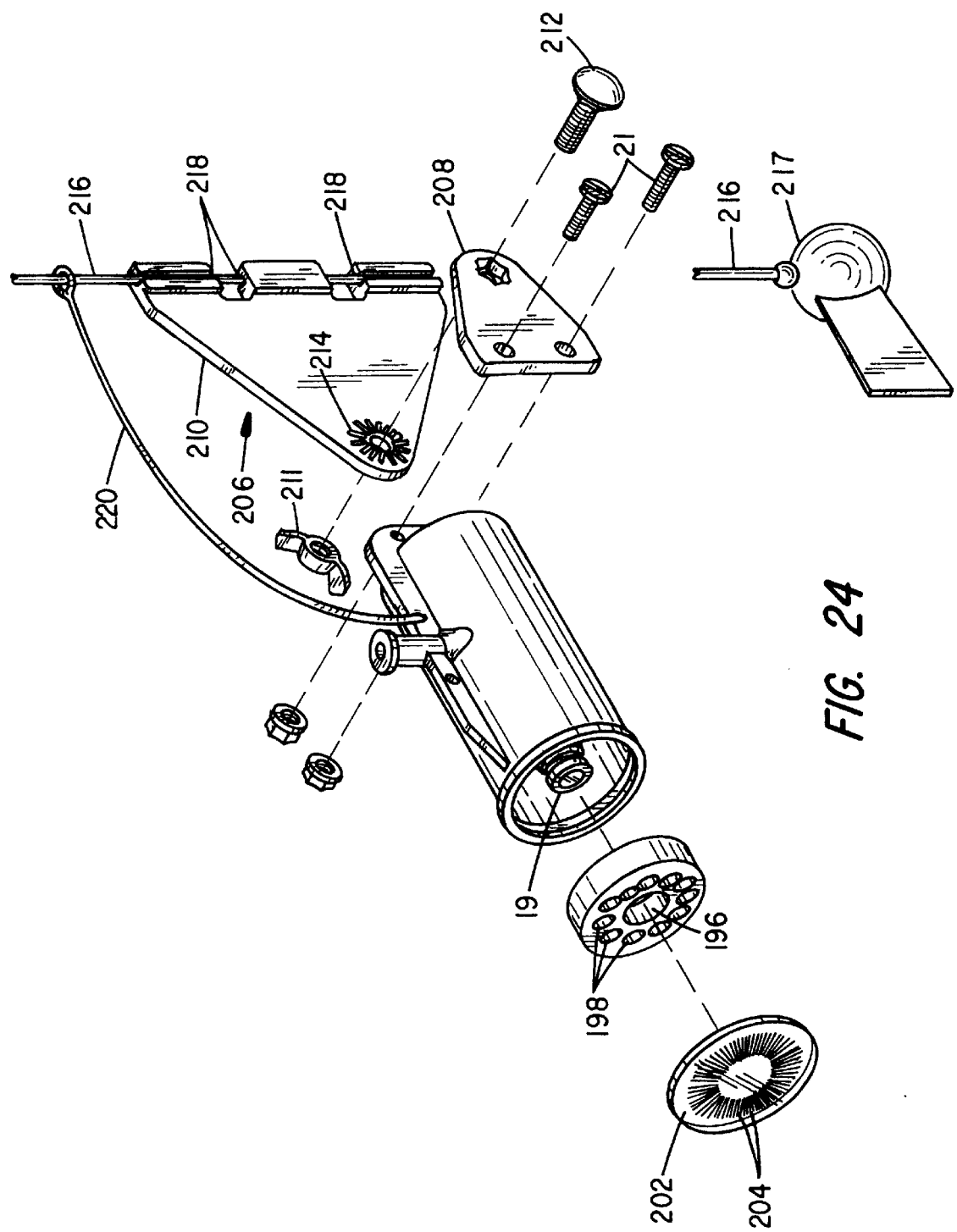
FIG. 24 is a perspective view shown in exploded assembly to a camera having a light diffuser/reflection suppressor ring mounted behind an etched lens cover and that is supported by an adjustable clip to a downrigger ballast cable.
Figure 25:
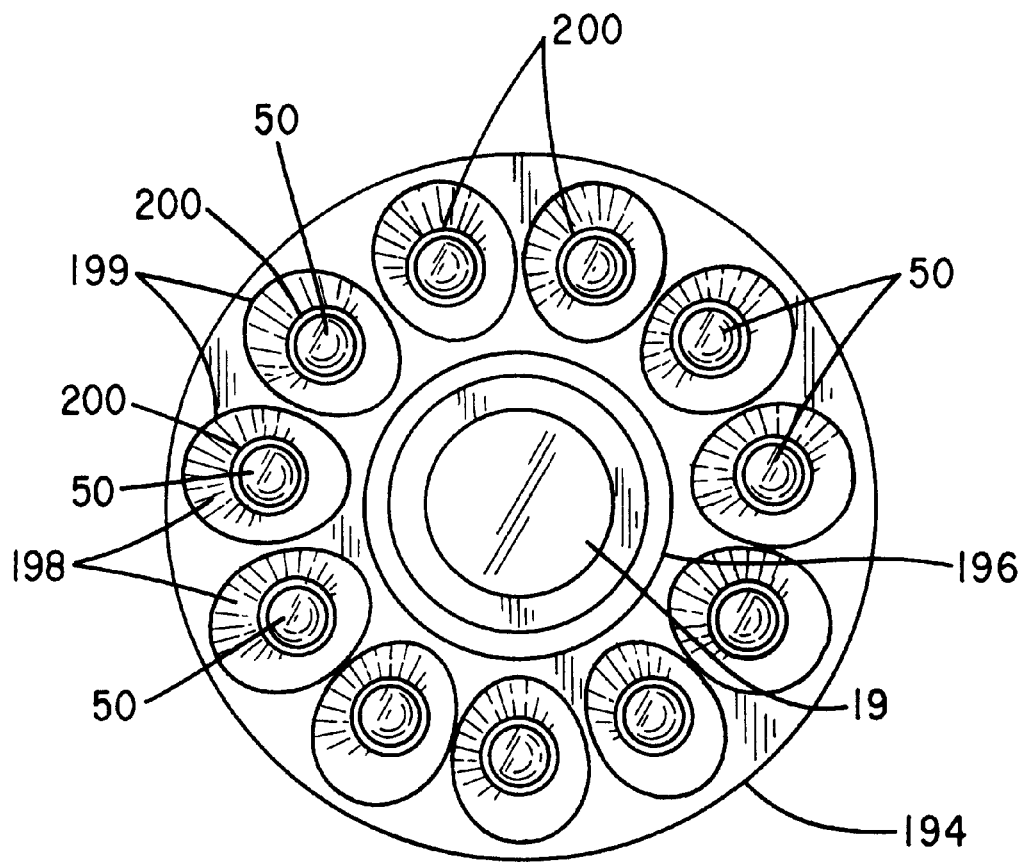
FIG. 25 is a front view of the light diffuser/reflection suppressor ring centered to the camera LED's.

The clip 34 finds particular application when suspending the camera 10 from a relatively stationary platform, such as an ice fishing house or other stationary structure. FIGS. 24 and 25, which are discussed below, show an adjustable clip that can attach the camera to a downrigger cable to adjust the camera orientation when towed. Other attachments can be fitted to the cable 8 and/or camera 10. FIGS. 7, 8 and 9 show various assemblies to provide a stationary orientation of the camera 10.

FIG. 7 shows an arrangement where a support 33 grips the cable 8 and suspends the camera 10 from an ice hole. The support 33 spans the hole and includes an arm 35 that is biased by a spring 37 to grip the cable 8.

FIG. 8 shows a support 39 that contains the camera 10 and can rest on the bottom of a lake. The orientation of the camera 10 can be changed by varying the relative angle of pivot arms 41 and 43 and the rotation of a relatively heavy base plate 45.

FIG. 9 shows another lake or river bottom camera support 47. Formed arms 49 are secured to the web 20. The arms 49 can be splayed apart to support the camera 10 at the bottom, such as a mud bottom. The camera 10 can also be tipped or rotated relative to the arms 49 to obtain a preferred viewing orientation. The arms 49 can be weighted or mounted to holes provided at a separate ballast weight.

Figure 10:
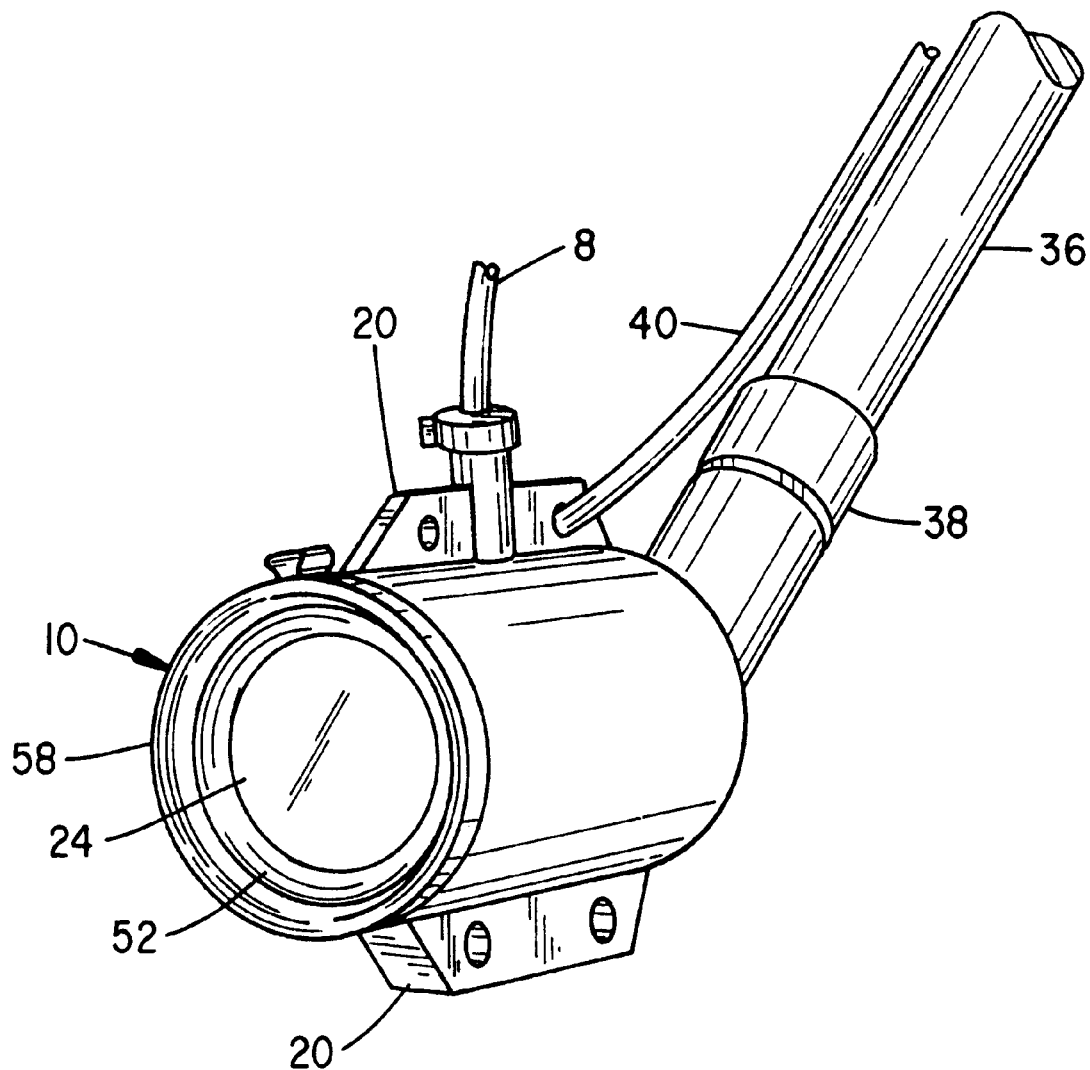
FIG. 10 is a perspective view of the camera rigged to a pole and with a steering cable.

FIG. 10 shows a mounting arrangement of the camera 10 wherein the camera 10 is secured to a pole 36. The pole 36 allows an operator to view under docks, inspect the bottom of a boat, walls of a swimming pool or other submerged structures etc. A swivel coupler 38 is fitted between the pole 36 and camera 10 and a steering wire 40 is secured to the top camera web 20. The coupler 38 houses a joint capable of motion in multiple axes. As the wire 40 is extended, retracted or rotated the camera 10 can be tipped and/or rotated in relation to movement of the pole 36 to optimally position the camera 10 for viewing.

A variety of coupler types 38 that include ball or universal joints to provide a desired freedom of movement can be fitted to the camera 10. The specific mechanical attachment to the camera 10 will depend upon the configuration of the coupler 38. The cable 8 might also be outfitted with a steering wire 40 or servo-control that cooperates with a coupler 38 at the camera 10 to direct camera motion when towed or suspended.

Figure 11:
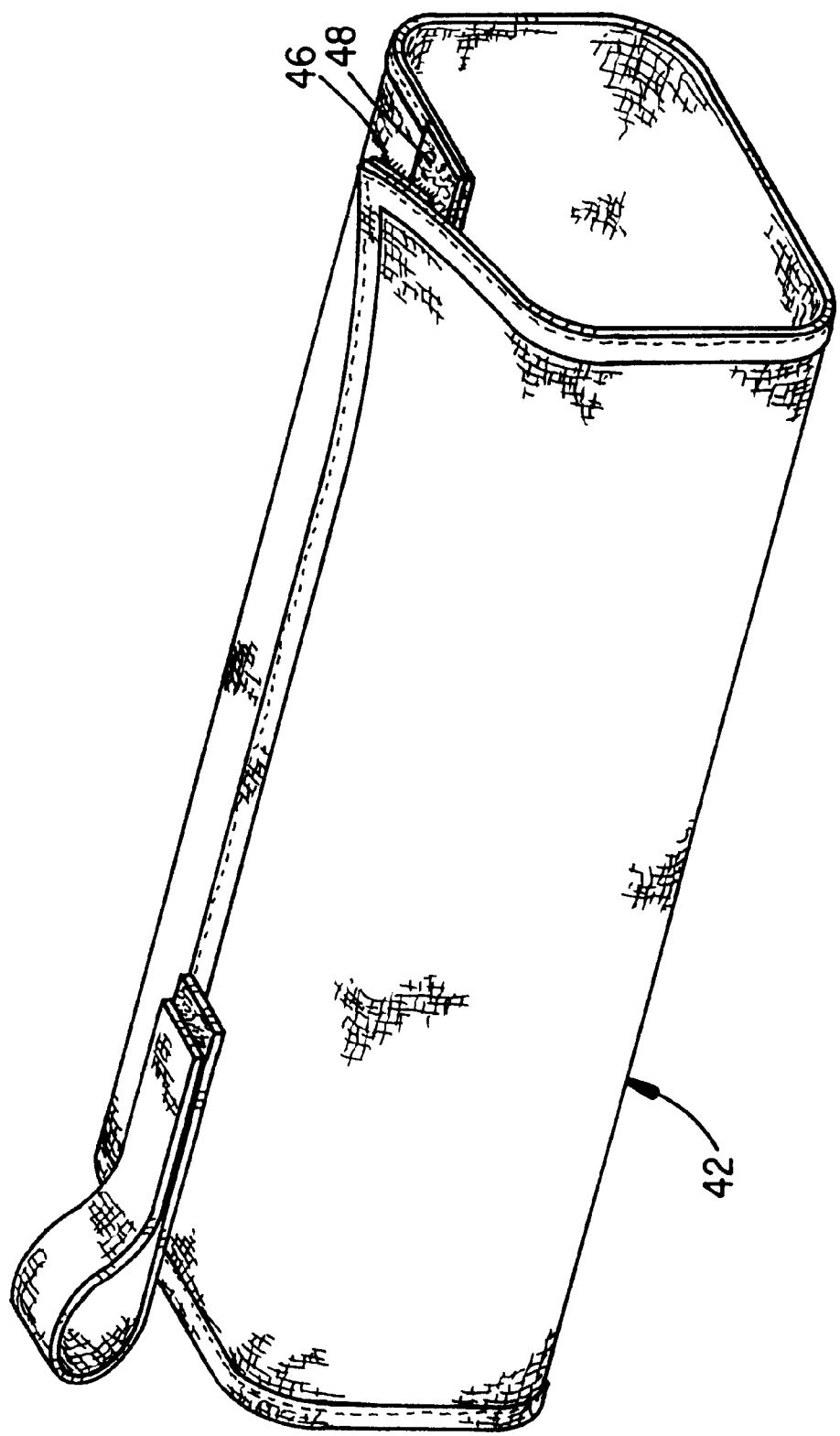
FIG. 11 is a perspective view shown in partial cutaway to the viewing monitor shrouded with a fitted fabric sun shield.

Depending upon ambient lighting conditions at the surface and below the water, the system 2 includes provisions at the monitor 6 and camera 10 to improve viewing. A sunshield 42 is shown at FIG. 11 that can be mounted to the monitor 6 to overcome sunlight and reflections at the screen 44. The shield 42 is made from an opaque fabric material and can be sewn to a shape appropriate to fit the monitor 6. The sections of the sunshield 42 can also be constructed of rigid materials, such as various plastics or sheeting materials. Alternatively, strips of hook and loop fastener material 46 and 48, such as VELCRO, or other mating fasteners can be positioned over the surface of the shield 42 to fit monitors of a variety of shapes. Contrast and gain controls at the monitor 6 can also improve viewing. The sunshield 42 might also be constructed with multiple telescoping sections that mount to each other.

Returning attention to FIG. 4 and mounted inside the camera housing 22 and concentrically arranged around the circumference of the camera lens 24 are a number of infrared (IR) lights 50 that operate in the range of 750 to 900 nanometers. Power to the lights 50 is provided from the boat 4. The lights 50 increase the available ambient light and can improve the viewing distance by several feet. The lights 50 find particular application when attempting viewing in stained waters or at depths of 30 or more feet. Typical viewing distances of 10 to 15 feet are possible with the camera 10 and IR lights 50.

Although IR lights 50 are presently preferred, infra-blue (IB) and/or infra-green (IG) lights or combinations thereof can be used to provide better light penetration with less scattering. A combination of five IR (i.e. 660 nanometer) and six IG (i.e. 560 nanometer) lights has been found to provide approximately twice the visibility of an equivalent number of the foregoing higher powered IR lights alone. Control circuitry is also provided to control the lights 50. Other circuitry can be provided to control the switching frequency of the lights. Lights operating at spectrum frequencies visible to humans, fish etc. can also be included to attract fish, plankton etc.

Although improving viewing, the intensity and reflection of the lights 50 at the inside surface of the lens 24 can raise the operating temperature of the camera 10. Internal heating is partially offset by the cooling provided by water. Internal heating is also reduced with improvements provided below at FIGS. 24 and 25.

Particulates in the water can also reflect light back into the lens 24. These reflections can be minimized with a bi-focal surface 52 at the lens 24. The surface 52 aligns with the lights 50 and diffuses light away from the center of the lens 24. The surface 52 can be formed into the lens 52 or as a separate lens. An anti-reflective coating 53 to IR light is also applied to the interior of the lens 24 to minimize and/or prevent reflections. An ultraviolet (UV) coating can also be included at the outer surface of the lens 24 to improve image contrast.

The internal operating temperatures of the camera 10 can also be minimized by mounting one or more piezoelectric coolers 54 to the back of a circuit board 56 that controls the camera 10 and other circuitry at the camera 10. The additional cooling from the coolers 54 can reduce the operating temperature to 10 degrees Centigrade versus a normal operating temperature of 30 to 40 degrees Centigrade. See also the discussion with respect to FIG. 24 to a light reflecting ring that improves the operating characteristics of the camera 10.

The camera's rubber housing 22 is also constructed to provide an extension ring 58. The ring 58 extends beyond the lens 24 and provides a resilient surface or bumper that protects the lens 24. The recessed lens 24 is thereby protected from abrasion and scratching, for example, if rocks or other hard objects are encountered.

The housing 22 is also filled with a desiccant material 57 (e.g. $SiO_2$) to prevent moisture that might occur with normal expansion and contraction of the housing 22. The interior of the housing 22 can also be charged with an inert gas such as nitrogen or argon to prevent fogging at the lens 24.

Figure 12:
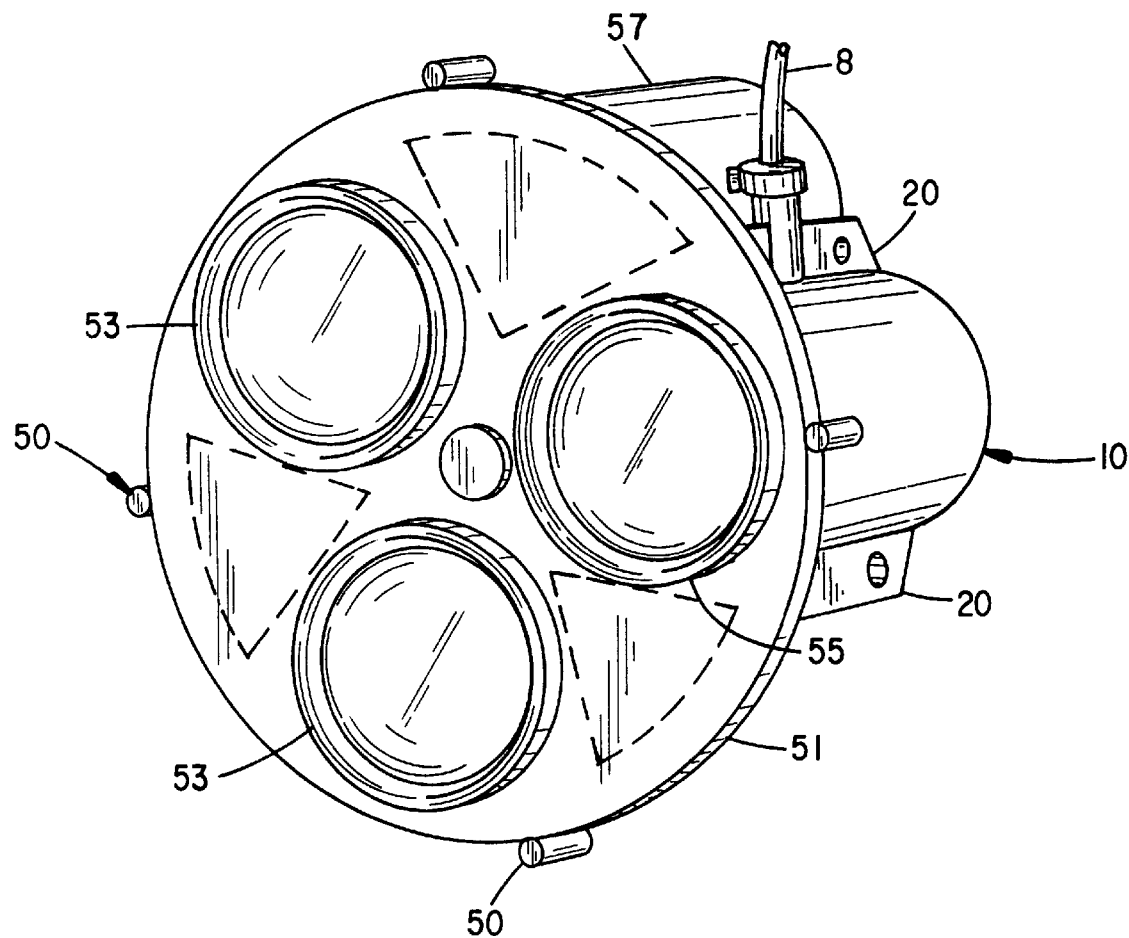
FIG. 12 is a perspective view of a camera fitted with a servo-controlled collar that supports a number of filters and/or lenses that can be rotated into registry with the camera lens.

A light filter and/or lens collar 51 can be mounted to the exterior of the camera 10, as shown at FIG. 12, or with appropriate modification to the interior. The collar 51 facilitates viewing in water of differing clarity and under diffused sunlight conditions. The collar 51 supports a number of filters 53, although can also support one or more lenses 55 of various magnifications and having other desired optical characteristics. Additional lights 50 can also be secured to the collar 51 to increase illumination in heavily stained waters. A servo drive 57 mounted to the collar 51 selectively rotates a desired filter 53 or lens 55 into alignment with the lens 24. The rotation can be performed either manually or under operator control via one of the conductors 12.

Alternatively, a conventional threaded collar 51 can be fitted to the camera 10 such as at the extension ring 58. An appropriate one of a variety of conventional threaded filters 53 or lenses 55 could be mounted to the collar 51 prior to immersion. Filters 53 can filter light from any desired portion of the visible spectrum, for example, blue or red light. A filter that polarizes the light can also be attached.

The outer periphery of the collar 51 can also be extended and/or shaped, such as in a tubular form, to shade the lens 24 from ambient light in the water. A detachable section might also be mounted to the collar 51 or used alone to provide shade. The collar 51 may also include apertures (shown in dashed line) between the filters 53 and/or lenses 55 to permit water to flow through the collar 51.

Figure 13:
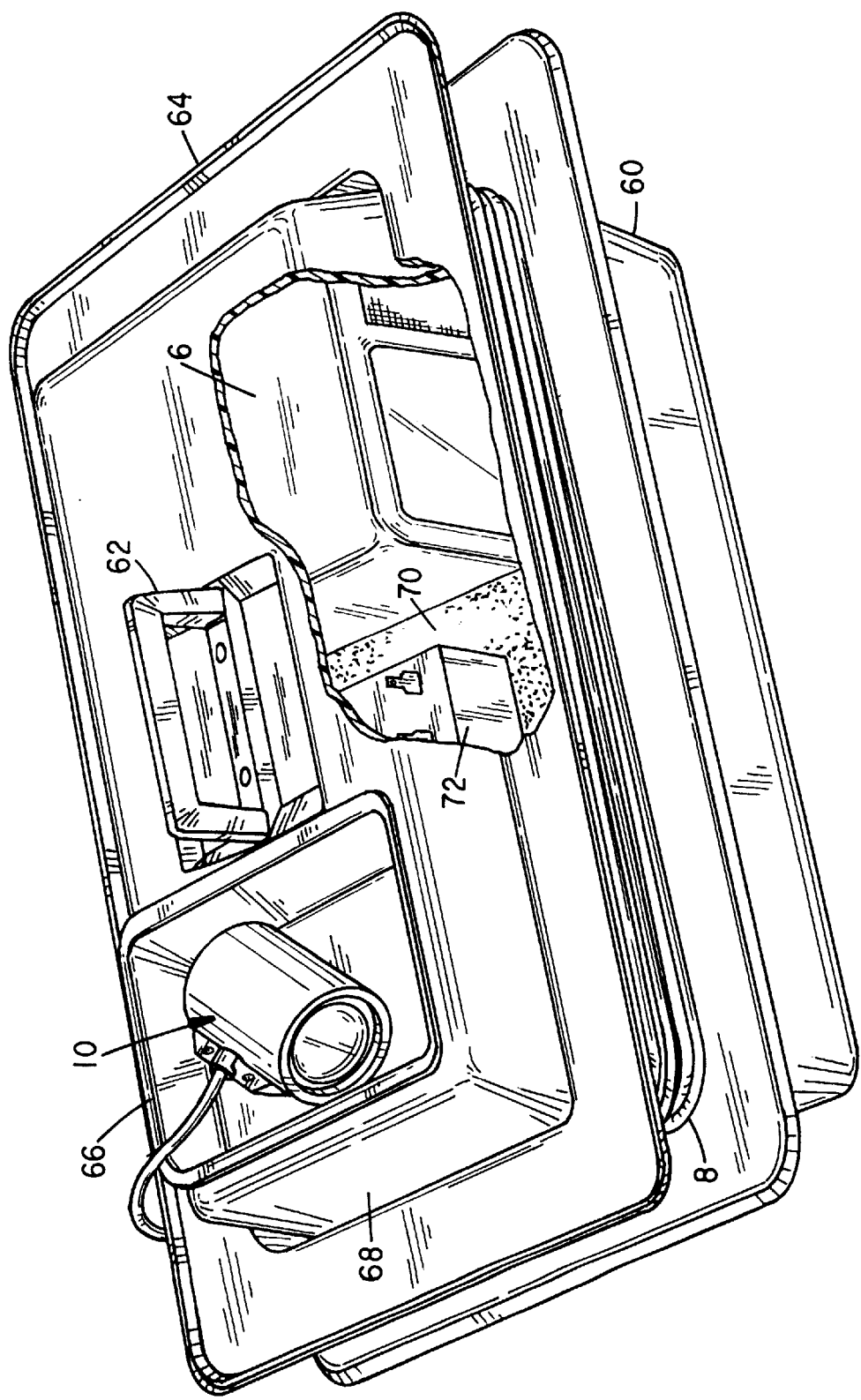
FIG. 13 is a perspective view of a carry case for the system components.

FIG. 13 depicts a portable storage arrangement of the system components. A carry case 60 having a handle 62 is fitted with a spool 64 that contains the cable 8. A bin 66 is recessed into a hinged cover 68 and supports the camera 10. A shaped foam pad 70 inside the case 60 supports the monitor 6, a battery power supply 72 and other system accessories, such as the rudder 16, ballast 18, cable clip 34 and sunshield 42.

Figure 14:
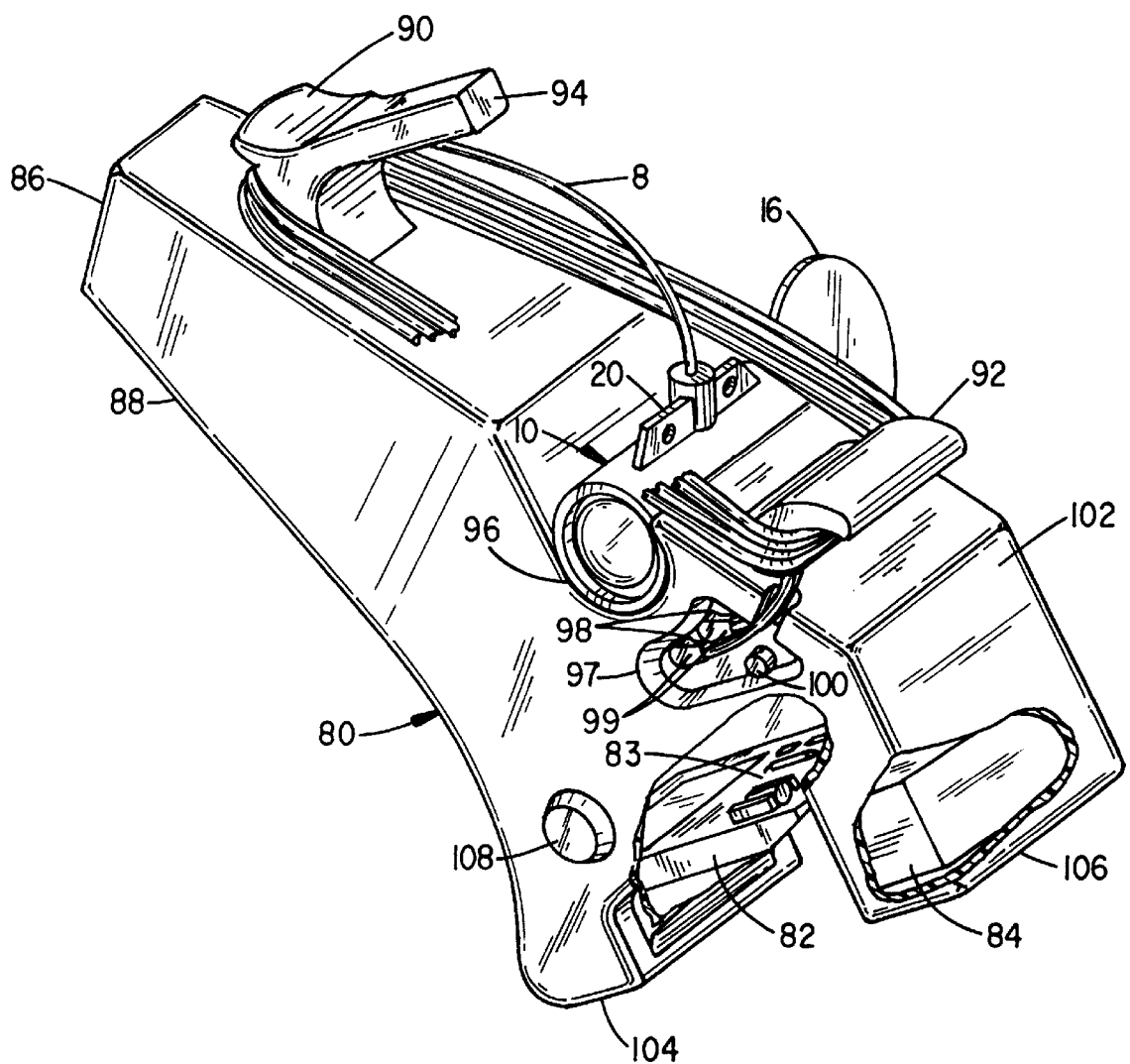
FIG. 14 is a perspective view, shown in partial cutaway, of the system components mounted in a portable monitor housing that includes an integral sun shield, the camera and cable and sundry accessories.

Although the carry case 60 adequately contains the system 2 and accommodates normal deployment of the monitor 6 and camera 10, it is preferable to integrate many of the components that are accessed by the operator into a self-contained package. FIG. 14 depicts a housing 80 that is constructed to securely contain a monitor 82, battery supply 84 and necessary control circuitry 83 into a single housing 80. The monitor 82 is viewable through a viewing port 86 at an integrated sunshield 88. The sunshield extends a sufficient distance and tapers inward to minimize the effects of ambient lighting in viewing the monitor 82. Although a rigid single section sunshield 88 is shown, the sunshield 88 can be constructed of telescoping sections.

The cable 8 wraps over curved wrap arms 90 and 92. The arm 90 is projects from the sunshield 88. A carry handle 94 extends from the arm 90. A recessed cavity 96 is provided between the arms 90 and 92 to supports the camera 10, attached rudder 16 and/or ballast 18. Other recesses or compartments might be provided in the housing 80 to contain other accessories.

Necessary electrical attachments and controls are provided at a recess 97 in a sidewall. Couplers 99 at the ends of the conductors 12 mount to the available fittings 98. A multi-position switch 100 controls power to the camera 10, lights 50 and monitor 6. A removable cover plate 102 provides access to the battery 84, monitor 82 and control circuitry 83. The control circuitry can accommodate all system functions including battery charging, auxiliary power, communications, servo-control, sensor monitoring and display etc.

The housing 80 facilitates a controlled deployment of the camera 10. With the release of a sufficient length of cable 8, viewing is readily accommodated through the shaded viewing port 86, while either seated or standing. The viewing port 86 is positioned in a range of 60 to 80 degrees relative to the support surface on which the housing 80 rests.

Although the housing 80 is normally supported from a pair of feet 104 and 106 on a hard surface, pivot arms 108 project from each side of the housing 80. The pivots 108 mount to a bracket 110 that can be mounted to a wall of the boat 4. The housing 80 can be restrained with hand fasteners 111, reference FIG. 15. Gripping pads, magnets, suction cups or other gripping aids may also be supported to the feet 104 and 106 to stabilize the housing 80 during viewing.

Figure 15:
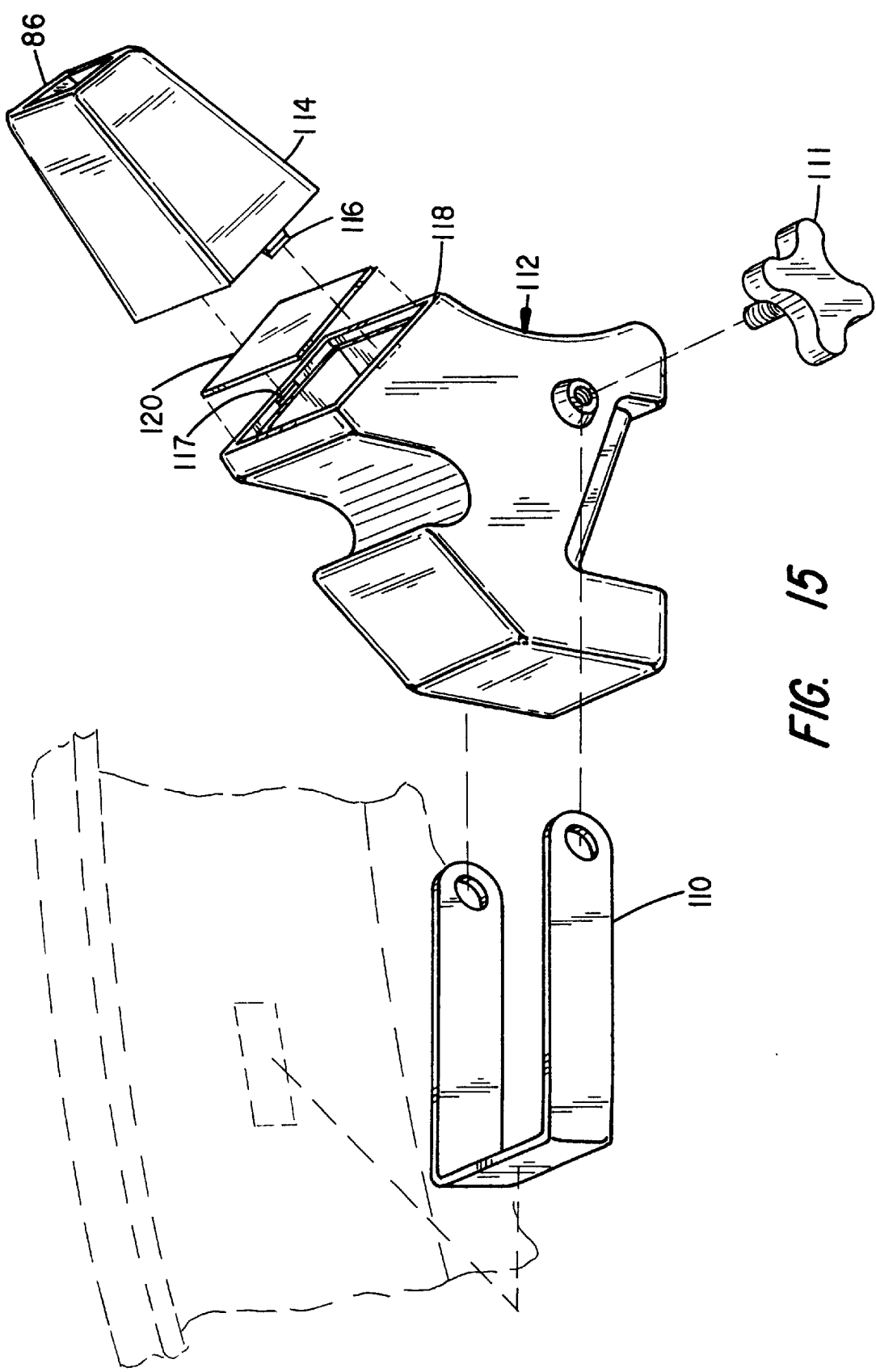
FIG. 15 is a perspective view of a monitor housing wherein the sun shield can be rotated or removed to permit viewing through a filter screen and/or the housing can be mounted to rotate at a support bracket.

With attention to FIG. 15, a housing 112 is shown that is similar to the housing 80. A detachable sunshield 114 attaches to the housing 112 at a number of mating fasteners 116, and 117, such as overlapping flanges of interlocking projections and apertures. The sunshield 114 can also be hinged to the housing 112. The size of the viewing port 118 is provided at the point of attachment of the sunshield 114. The port 86 or 118 can thereby be varied. The port 118 can also be covered with a darkened glass screen or cover 120, when the sunshield is not required.

FIG. 16 shows the housing 80 outfitted with a cable boom arm 15. A motor contained in the housing 80 and operating under an internal control deploys the cable 8 from a spool attached to or formed into the housing 80. If used with a boat, the housing 80 would normally be secured to the boat to assure proper control over the cable. Although not shown, cable wrap arms 90 and 92 can be incorporated into the housings 80 and 112 of FIGS. 15 and 16.

Figure 17:
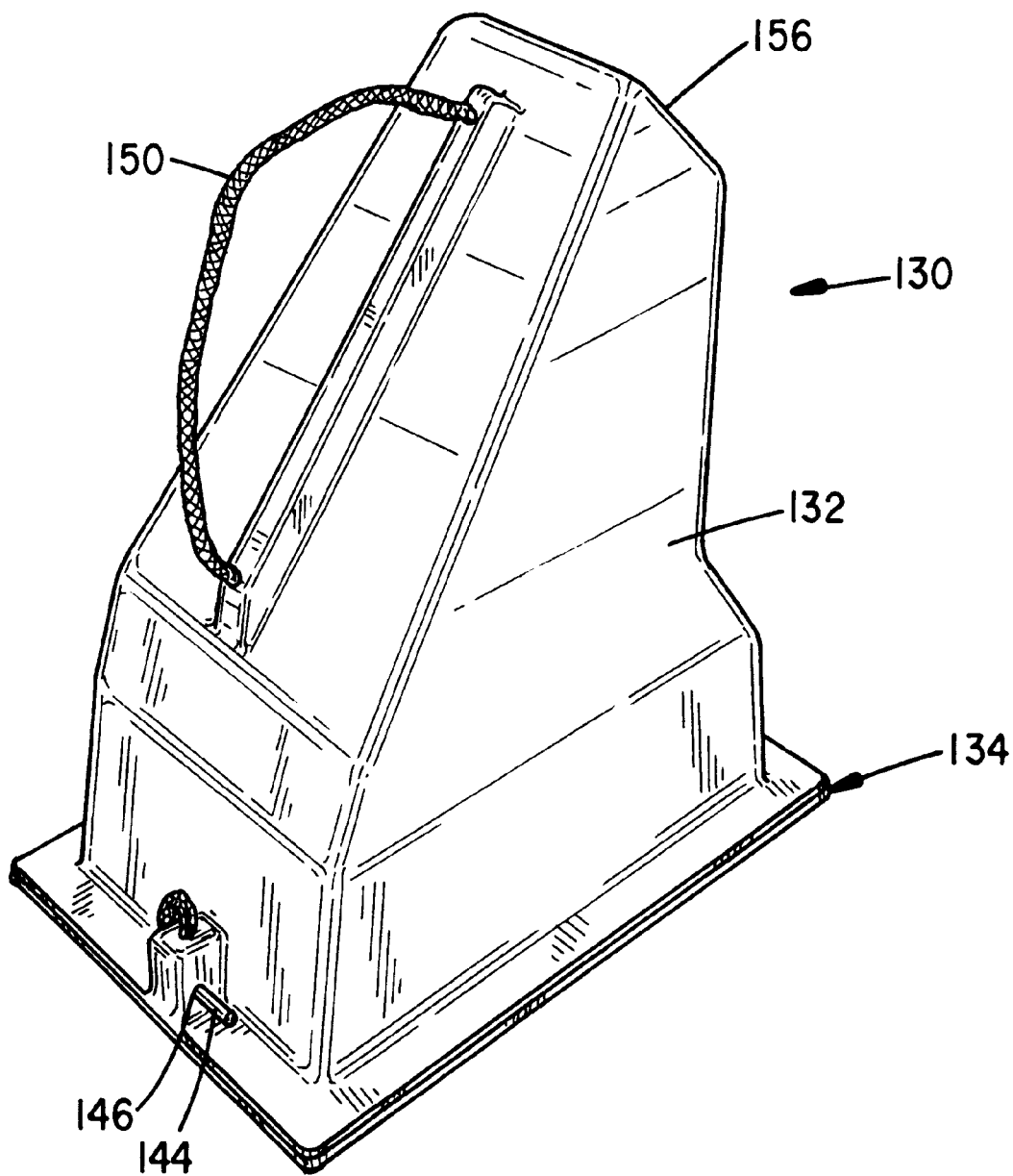
FIG. 17 is a perspective view of a portable monitor housing that has a detachable sunshield.
Figure 18:
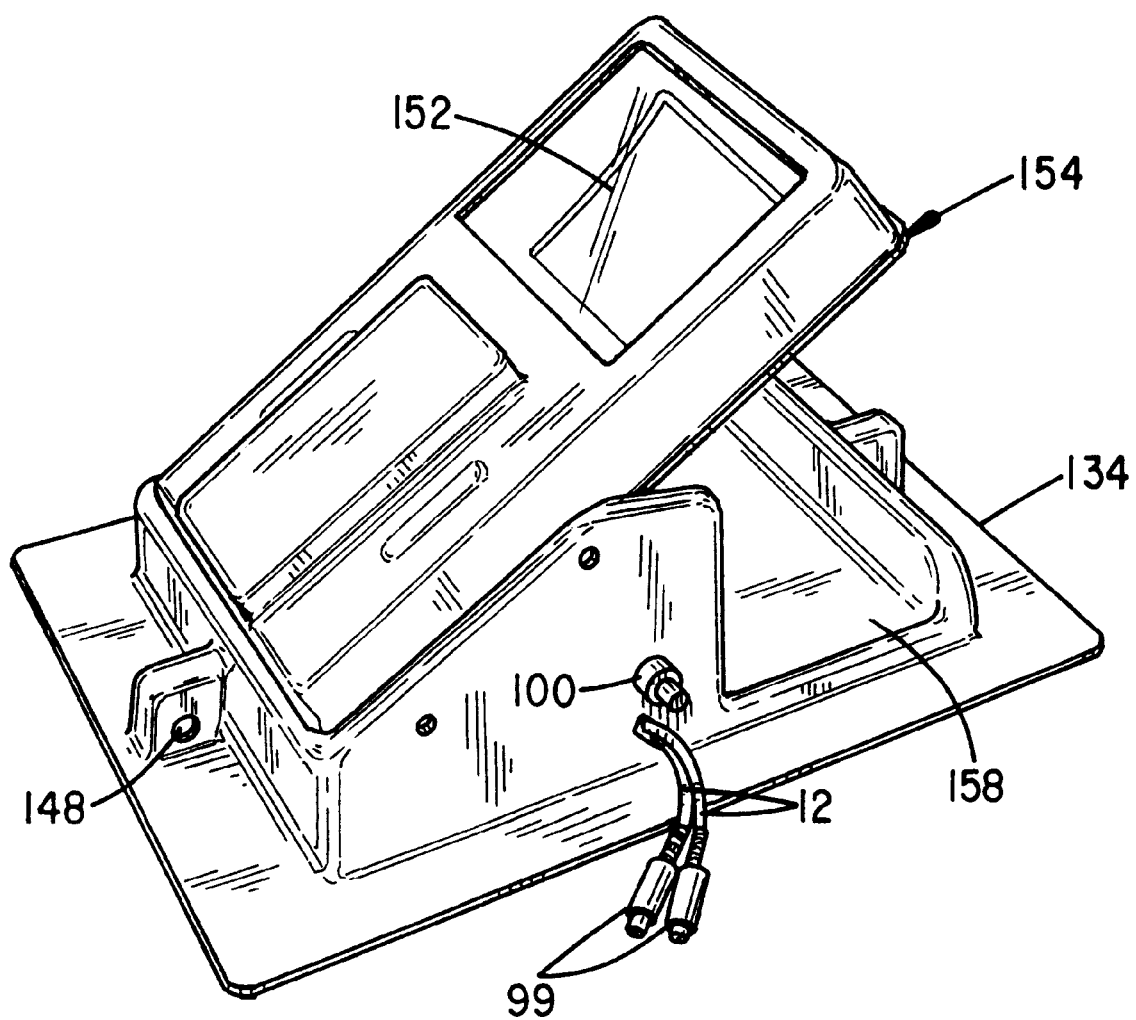
FIG. 18 is a perspective view of the portable monitor housing of FIG. 17 with the sunshield removed to show the monitor.

FIGS. 17 and 18 show an alternative monitor assembly 130 and wherein a cover or sunshield 132 is detachably mounted to a base housing or monitor support 134. The sunshield 132 is significantly shorter than the sunshield 88. FIGS. 19 and 20 show two other housings 136 and 138 that provide hand wound cable take-up spool assemblies 140 and 142. The cable 8 from the spool 142 separately couples to a remote monitor, such as the monitor 130, or a video recorder (not shown).

With attention to FIGS. 17 and 18, the sunshield 132 is secured to the monitor housing 134 with a pair of pins 144 at aligned bores 146 and 148. A rope handle 150 extends from the sunshield 132. In normal use, the screen 152 of a covered monitor 154 is visible through a viewing port 156. A battery power source (not shown) mounts in a space 158 at the housing 134.

FIG. 19 depicts the monitor assembly 136 and which provides a molded plastic housing 160 having a shape generally similar to the housing 80. A handle 162 projects from the housing 160 between a viewing port 164 and the spooled cable take-up assembly 140. A spool 166 is supported to rotate within a surrounding tray 168. A generously sized slot 170 opens to the spool 166 and storage space at the tray 168 to guide the cable 8 into and out of the tray 168. A crank arm 170 rotates the spool 166. A motorized drive might also be included to avoid hand operation.

A commercial slip ring assembly includes conductive terminals that couple to conductors that extend from a monitor 82 (not shown) contained in the housing 160. Other terminals in the slip ring assembly overlap and contact the monitor terminals. The overlapping conductors act in the fashion of slip rings to transfer signals to and from the monitor and the conductors 12 in the cable 8. A variety of differently arranged slip ring assemblies can be used to effect a suitable electrical coupling.

The housing 138 of FIG. 20 includes the hand-operated spool 142. The cable 8 is retracted and released from the spool 142 via a hand crank arm 172. A handgrip 174 is provided at the top of the housing 138 to facilitate transport and operation of the crank arm 172. Audio and video connectors or jacks 173 and 175 project from the housing 138 and couple to a remote monitor, such as the monitor 130, a conventional TV or a video recorder. Conductors 12 in the cable 8 couple to the jacks 173 and 175 via a suitable slip ring assembly at the axle of the spool 142.

The camera 10 is supported to a multi-section ballast 180. The camera 10 can be supported to the ballast 180 for forward or rear viewing. Identically shaped ballast pieces 181 are secured to each side of the lower web 20 of the camera 10 with nut and bolt fasteners 21, see also FIG. 21 and wherein an enlarged view is shown to the camera 10. Each ballast piece 181 presents an aero or hydrodynamic shape. A wing 182 laterally projects from the longitudinal side of each ballast piece 181. Forward and aft ends 184 and 186 are shaped to cooperate and stabilize camera movement. A rudder 188 extends from the rear camera web 20.

Figure 22:
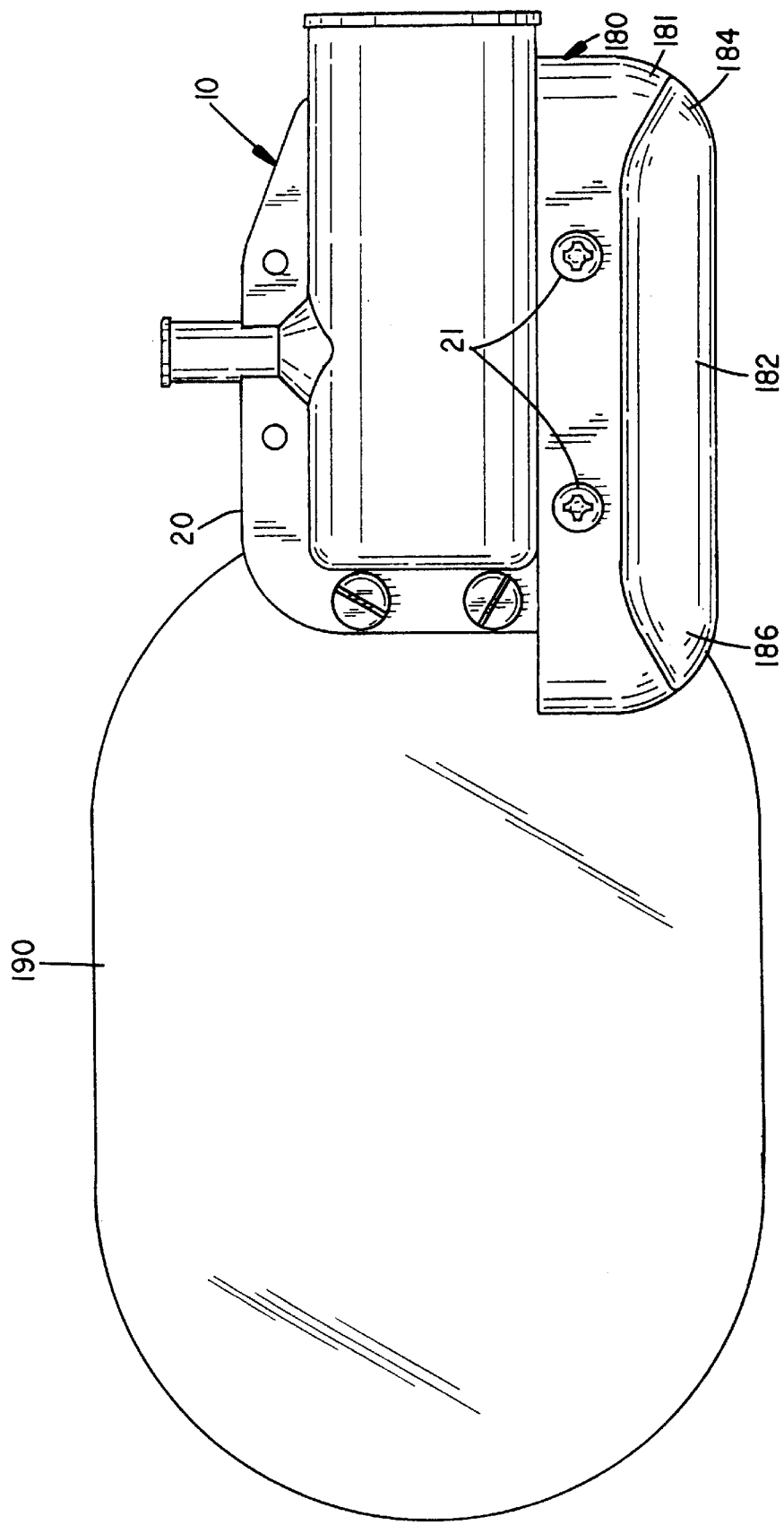
FIG. 22 is a plan view to a third configuration of a forward viewing camera, ballast and tracking fin.

FIG. 22 shows a camera 10 fitted with an enlarged rudder 190. The rudders 188 and 190 provide a longer longitudinal surface versus the rudder 16. The rudders 188 and 190 have been found to reduce lateral sway and/or twisting of the camera, while promoting a straight-line tracking.

FIG. 23 shows another camera 10 mounted to the ballast 180. A keel 192 depends from the ballast 180 and the camera 10 is mounted in a rear facing orientation. The ability to arrange the camera 10 for forward or rear viewing enhances operator options. Depending upon the configuration of any lens/filter arrangement at the camera housing, a rear viewing camera 10 can reduces turbulence and promote tracking.

Returning attention to FIG. 20 and mounted in front of the internal camera lens 19 and lens cover 202 of the camera 10 is a chrome-plated light diffuser/reflection suppressor 194. A circular center bore 196 is aligned to the internal viewing lens 19 of the camera 10. A series of concentric bores 198, in turn, are aligned to the individual lights 50. With attention also to FIGS. 24 and 25, each of the bores 198 provides an elongated or oblong outer aperture 199 that tapers inward to a circular aperture 200. The tapered, oblong bores 198 are designed to focus and reflect the emitted light in a circular pattern around the camera's field of view without impinging on the internal lens 19. Undesired reflections are thereby avoided.

Light control is also enhanced at the lens cover 202 with a laser-etched pattern 204. An annular band containing a series of radial lines 204 is particularly provided that diffuses the light exiting the bores 198. The etched lines 204 prevent internal reflections and hot spots and facilitate the diffusion of the emitted light. The shape and placement of the pattern 204 can be varied as desired in relation to the number and placement of the lights 50. The pattern 204 may also comprise raised facets in lieu of etched lines.

Figure 26:
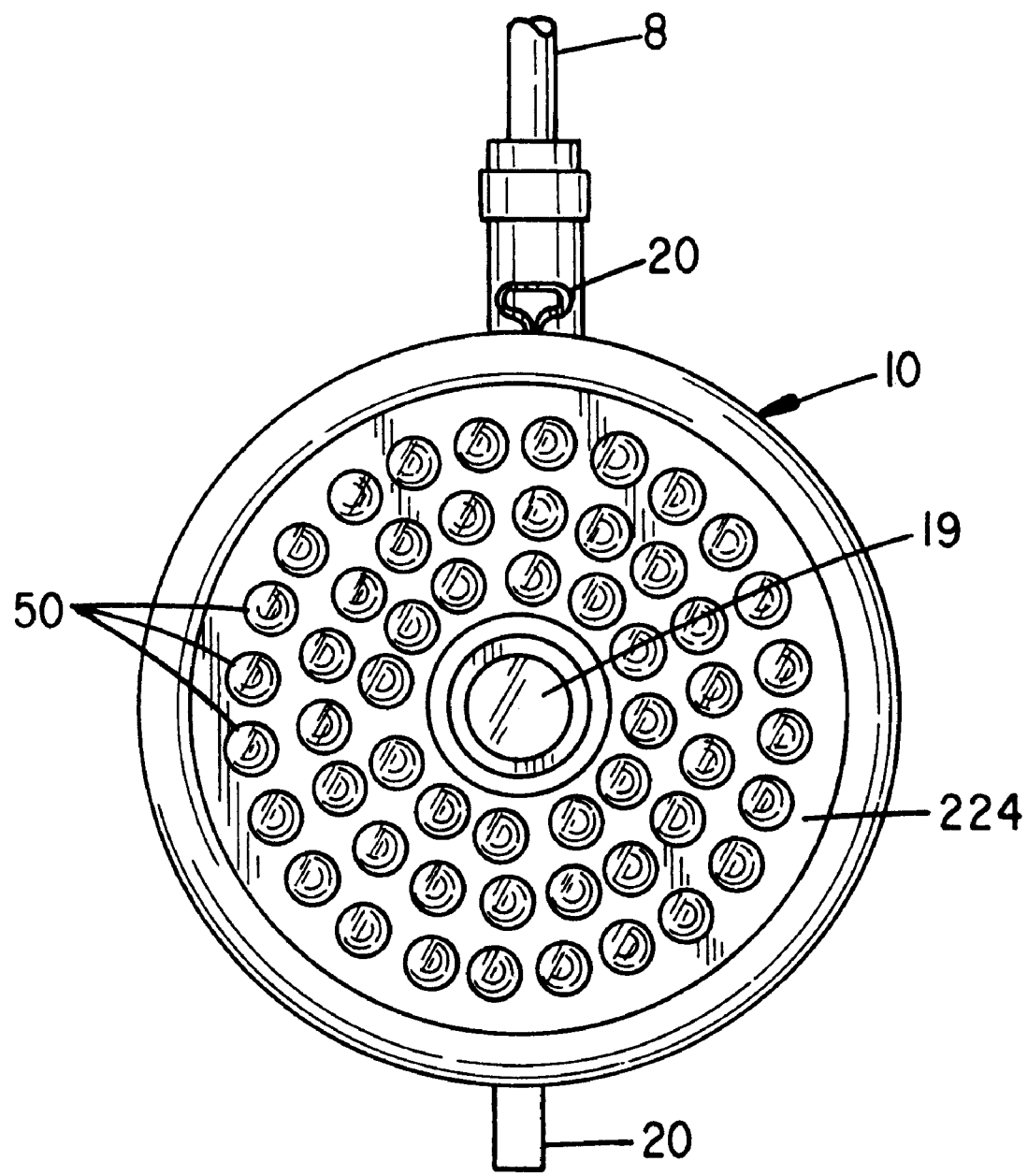
FIG. 26 is a rear view to the camera and downrigger cable clip of the assembly of FIG. 24.

Also shown at the camera 10 in FIG. 24 is a downrigger support clip assembly 206. A rear view of the assembly 206 is shown in FIG. 26. The assembly 206 includes an adjuster plate 208 and a clip plate 210. Fasteners 21 secure the adjuster plate 208 to the aft web 20 of the camera 10. A wing nut 211 and pivot fastener 212 secures the adjuster plate 208 to the clip plate 210. The clip plate 210 is secured to a downrigger cable 216 that is suspended from the boat 4 and attached to a weight 217 by weaving the cable into a number of vertically aligned grooves 218 at the aft end of the clip plate 210.

Upon adjusting the angle of the plates 208 and 210 and tightening the fastener 212 in relation to interlocking patterned surfaces 214 on the plates 208 and 210, a rear facing or back viewing orientation of the camera 10 is established relative to the downrigger cable 216. A separate tether 220 can be mounted from the cable 216 to the camera 10 to separately contain the camera to the cable 216.

Figure 27:
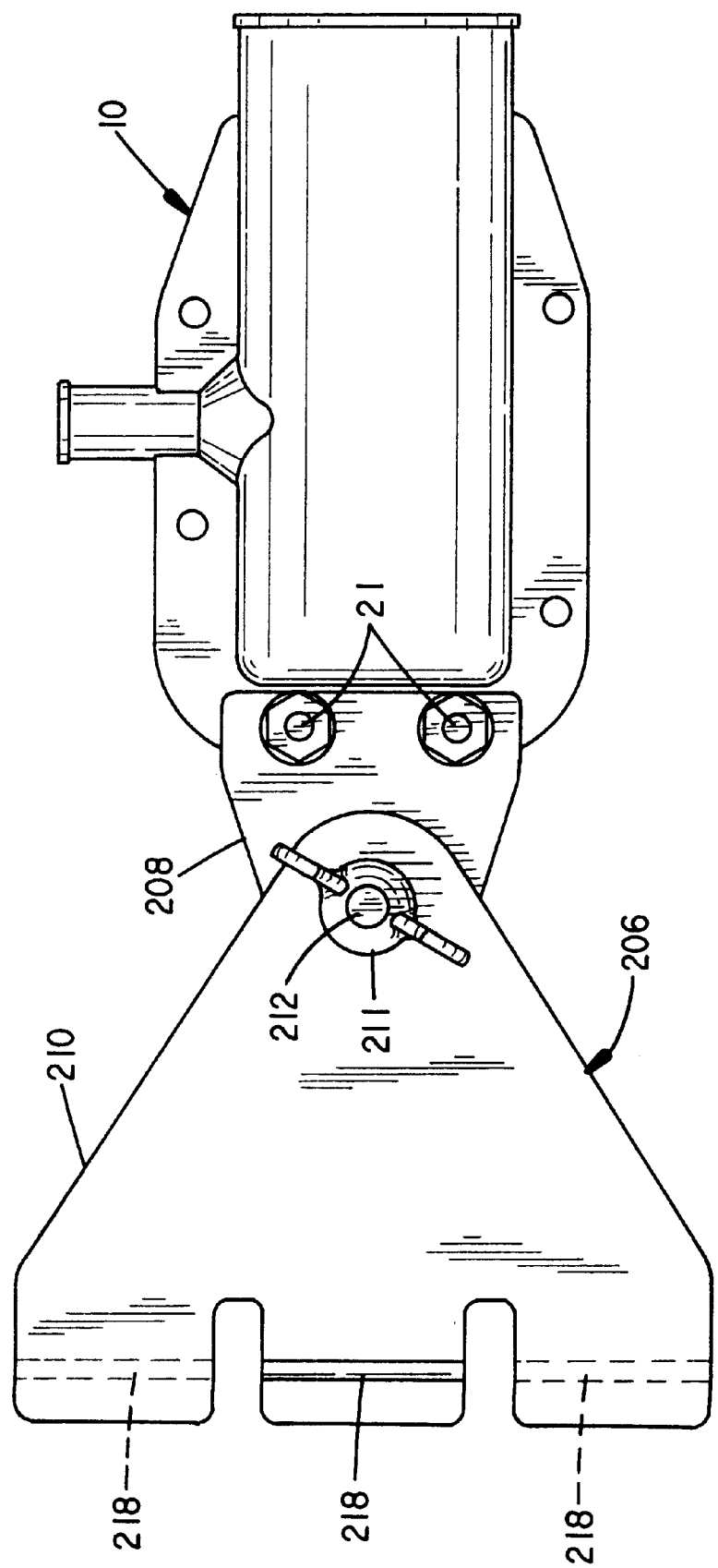
FIG. 27 is a front view of a camera outfitted with a concentric array of high intensity, non-visible LED's to that provide a flood lighting effect for low light situations.

FIG. 27 depicts another camera 222 that is outfitted with three concentric rows of lights 50 that surround the internal camera lens 19 and produce a "flood" light effect. The camera 222 is especially useful in stained and muddy waters. The lens cover 224 exhibits a convex dome shape to direct the light away from the lens 19. The cover 224 can also include an appropriate etched pattern to further direct the emitted light. The frequencies of the lights 50 can be arranged to any desired combination to facilitate viewing. Switching can also be included at the monitor housing to selectively control which of the lights 50 are illuminated.

Figure 28:
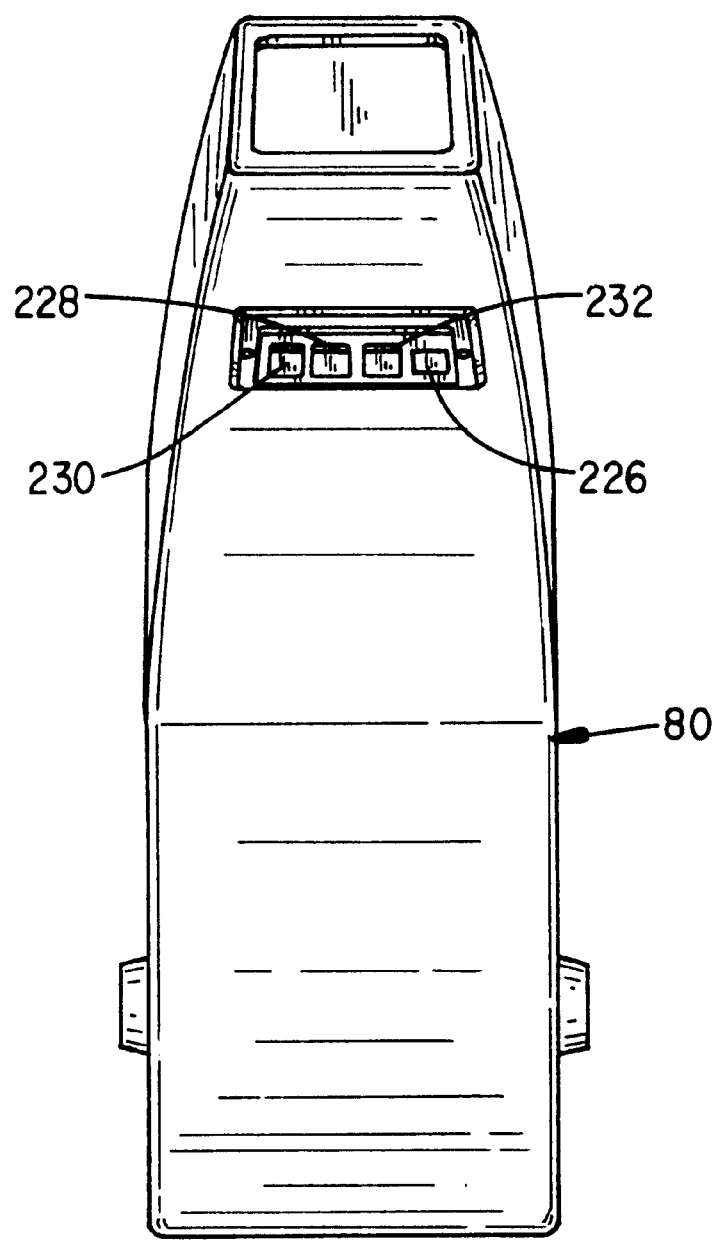
FIG. 28 is a perspective view of a portable monitor housing having a hand-cranked, cable take-up spool and wherein a slip ring assembly at the spool axle couples cable terminations at the spool to the housing circuitry.

Another feature that has been provided for in the present viewing systems is the ability to selectively store or save periods of viewed images. FIG. 28 depicts a series of control buttons that permit storing up to 32 digital still frame images for later replay. The feature is enabled with on/off button 226 and "store" button 228. The captured analog data is digitized and stored in a suitably sized RAM memory. A chronological time/date stamp can be imposed on the images via "time" button 230.

Once stored, the images can be re-played by pressing the "play" button. The system operator is thereby able to capture selected images for later viewing. The images can also be coupled to an appropriately configured printer.

Figure 29:
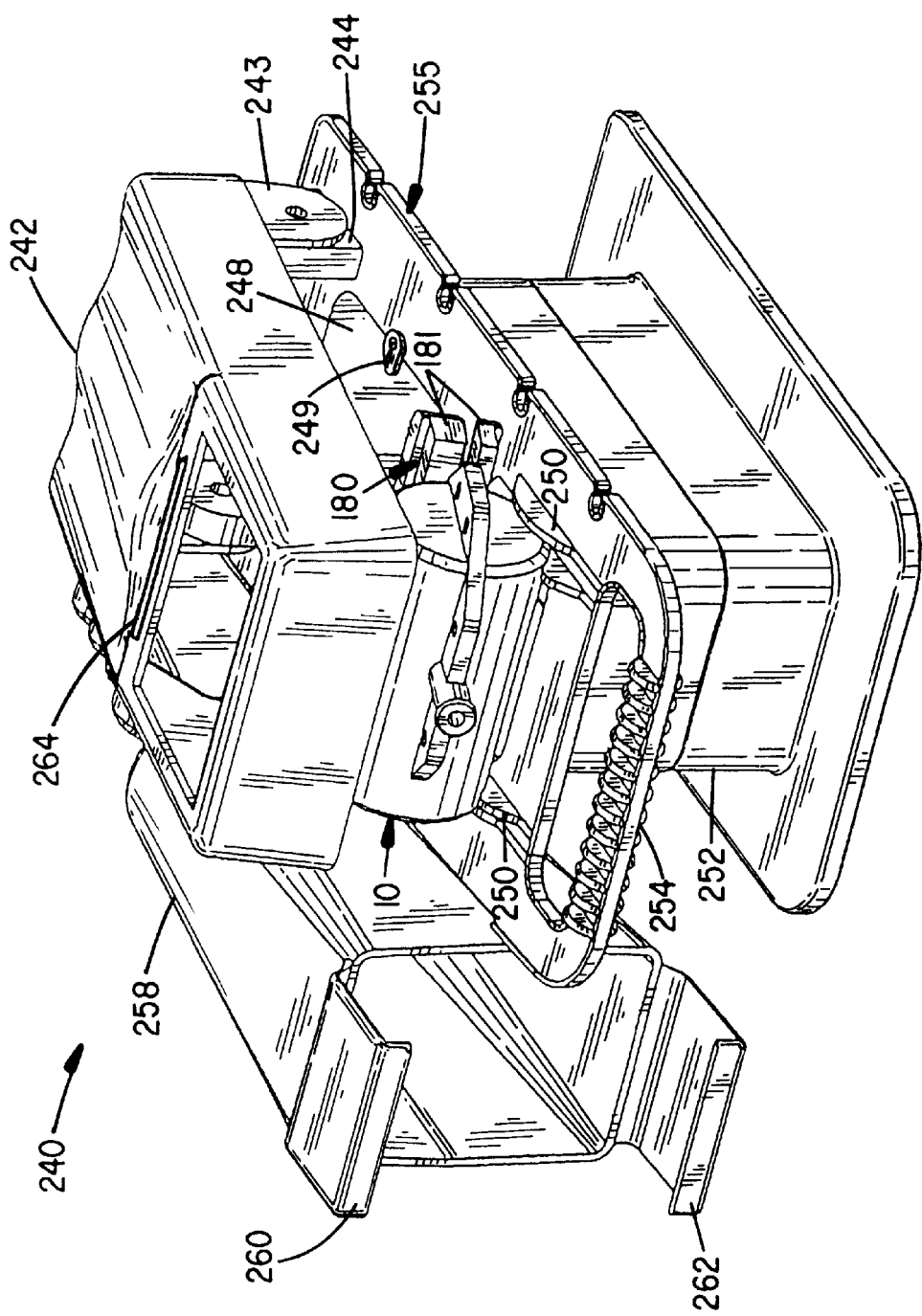
FIG. 29 is a perspective view showing front, right side and top views of another portable viewing system wherein a cable spool supports a storage battery, camera, hinged monitor and detachable sunshield.
Figure 30:
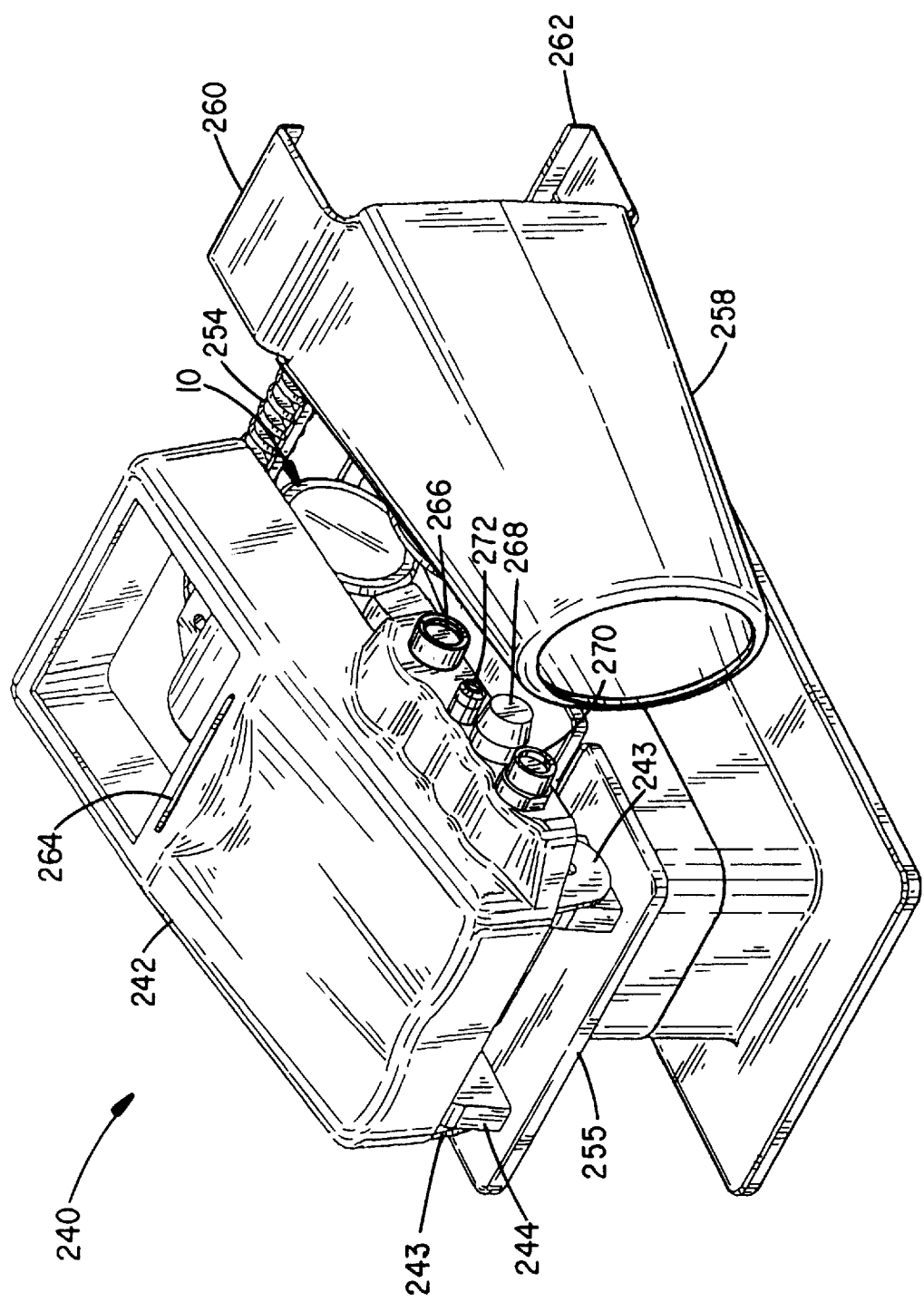
FIG. 30 is a perspective view showing rear, left side and top views of the portable viewing system of FIG. 29.

Another portable mounting assembly 240 of the present viewing system is shown in FIGS. 29 and 30. A monitor 242 having appendages 243 is mounted to pivot at a gimbal bracket 244 that projects from a shuttle housing 246. A cavity 248 is formed into the shuttle 246 to contain a storage battery (not shown). Pivot clips 247 retain the battery in the cavity 248. The camera 10 is contained beneath the monitor 242 between lateral uprights 250. The cable 8 (not shown) is wrapped and stored at a center spool 252 of the shuttle 246.

A handgrip 254 is formed into the end of an upper spool plate 255 that assists in shuttle transport and cable wrapping. A series of cable lacing notches 256 at the edge of the plate 255 contain the cable 8, once deployed, until the cable 8 is released and re-laced at the notches 256.

A sunshield 258 is slide mounted in dovetail fashion along an opposite edge of the upper plate 255. The sunshield 258 can be released and attached to monitor 242 by sliding the arms 260 and 262 along the sides of the monitor 242 until the sunshield 258 abuts the stop flange 264. At this point, the sunshield is aligned to the viewing screen.

An on/off switch 266 and fuse port 268 are provided adjacent a cable input jack 270 and video output jack 272. The shuttle 246 occupies a footprint of approximately 6 inches ×10 inches and readily mounts on available surfaces in a boat or viewing shelter.

While the invention has been described with respect to a preferred construction and considered improvements or alternatives thereto, still other constructions and improvements may be suggested to those skilled in the art. The foregoing description should therefore be construed to include all those embodiments within the spirit and scope of the following claims.

What is claimed is:

1. A submersible video viewing system, comprising:
    a) a camera encased in a waterproof rubber housing, wherein a plurality of lights are mounted in the housing around the periphery of a camera lens, wherein a lens cover is mounted forward of said camera lens, and wherein an annular member having a plurality of bores is mounted between said camera lens and said lens cover and such that each of said plurality of lights is coaxially aligned to each bore, whereby emitted light is directed to surround the field of view of the camera lens;
    b) a cable including a plurality of conductors; and
    c) monitor means having a display screen coupled to said camera by said conductors for displaying video images captured by said camera at said display screen.

2. A viewing system as set forth in claim 1 wherein said plurality of lights are concentrically arranged to said camera lens and said lens cover includes an etched pattern aligned to diffuse light emitted from said plurality of lights.

3. A viewing system as set forth in claim 1 wherein said plurality of lights comprises a plurality of infrared and infra green lights.

4. A viewing system as set forth in claim 1 wherein said plurality of bores taper inward as they extend aft from a forward aperture and wherein each of said bores exhibits an oblong forward aperture.

5. A viewing system as set forth in claim 1 wherein said camera housing includes a plurality of webs, wherein a first clip plate is secured to one of said webs, wherein a second clip plate having means for coupling to a cable is mounted to said first clip plate and including means for varying the angular orientation of said first and second clip plates to each other, whereby the orientation of said camera to a downrigger cable can be adjusted.

6. A viewing system as set forth in claim 1 wherein said monitor means is mounted to a monitor housing and wherein said monitor housing includes spool means for deploying and storing said cable.

7. A viewing system as set forth in claim 1 including a housing having a spool mounted thereto and wherein said cable is coupled to said spool for deploying and storing said cable.

8. A viewing system as set forth in claim 1 wherein monitor means is mounted to a monitor housing that supports said monitor means and wherein a detachable sunshield mounts to said monitor housing to align with said display screen.

9. A viewing system as set forth in claim 1 wherein said camera housing includes a plurality of webs, wherein a rudder is secured to one of said webs, wherein first and second ballast pieces are secured to one of said webs and wherein each of said first and second ballast pieces includes a laterally extending hydrodynamic wing, such that said camera tracks movement of said cable with minimal lateral motion and/or twisting.

10. A viewing system as set forth in claim 1 including means for capturing and storing digital images displayed at said display screen and for re-playing the stored images.

11. A submersible video viewing system, comprising:
    a) a camera encased in a waterproof rubber housing, wherein a plurality of lights operating at frequencies in the infrared and infra green spectrum are mounted in the housing in concentric relation to a camera lens, wherein a lens cover is mounted to said housing forward of said camera lens, wherein a plurality of webs project from the camera housing to support accessories selected from a class including ballast weights, rudders, couplers, and camera orientation supports;
    b) a cable including a plurality of conductors secured to the camera housing; and
    c) a power supply and monitor means having a display screen coupled to said camera by said cable for displaying images captured by said camera at said display screen.

12. A viewing system as set forth in claim 11 including an annular member mounted between said plurality of lights and said lens cover, wherein said annular member has a plurality of bores which taper inward as they extend aft from a forward aperture and wherein each of said bores is coaxially aligned to one of said plurality of lights.

13. A viewing system as set forth in claim 11 wherein each of said bores exhibits an oblong forward aperture and oblong taper.

14. A viewing system as set forth in claim 11 wherein said lens cover includes a plurality of etched lines that radially extend from the center of said lens cover and wherein said lines are aligned to diffuse light emitted from said plurality of lights.

15. A submersible video viewing system, comprising:
    a) a camera encased in a waterproof rubber housing, wherein a plurality of infrared lights are mounted in the housing in concentric relation to a camera lens, wherein a lens cover is mounted to said housing forward of said camera lens, and wherein a plurality of webs project from the camera housing to support at least an aerodynamic ballast weight and a rudder;
    b) a cable including a plurality of conductors and a strain relief member secured to the camera housing; and
    c) a power supply and monitor means having a display screen coupled to said camera by said cable for displaying images captured by said camera at said display screen.

16. A viewing system as set forth in claim 15 including an annular member mounted between said plurality of lights and said lens cover, wherein said annular member has a plurality of bores which taper inward as they extend aft from a forward aperture and wherein each of said bores is coaxially aligned to one of said plurality of lights.

17. A viewing system as set forth in claim 16 wherein each of said bores exhibits an oblong forward aperture.

18. A viewing system as set forth in claim 15 wherein said lens cover includes a plurality of etched lines that radially extend from the center of said lens cover and wherein said lines are aligned to diffuse light emitted from said plurality of lights.

19. A viewing system as set forth in claim 15 wherein said lens cover exhibits a forward surface that is shaped and aligned to diffuse light emitted from said plurality of lights away from the focal path of said camera lens.

20. A submersible video viewing system, comprising:
   a) a camera encased in a waterproof rubber housing, wherein a plurality of lights are mounted in the housing in concentric relation to a camera lens, wherein light control means for directing light emitted by said plurality of lights away from the focal path of said camera lens is mounted to the housing, and wherein a plurality of webs project from the camera housing to support accessories selected from a class including ballast weights, rudders, couplers, and camera orientation supports;
   b) a cable including a plurality of conductors and a strain relief member coextensive with said conductors and secured to the camera housing; and
   c) a power supply and monitor means having a display screen coupled to said camera by said cable for displaying images captured by said camera at said display screen.

21. A viewing system as set forth in claim 20 wherein said monitor means is mounted to a monitor housing that supports said monitor means and wherein a detachable sunshield mounts to said monitor housing to align with said display screen.

22. A viewing system as set forth in claim 21 wherein said monitor housing includes spool means for deploying and storing said cable.

23. A viewing system as set forth in claim 20 including means for capturing and storing digital images displayed at said display screen and for re-playing the stored images.

24. A viewing system as set forth in claim 20 wherein said light control means includes an annular member mounted between said plurality of lights and a lens cover mounted to said housing, wherein said annular member has a plurality of bores which taper inward as they extend aft from a forward aperture and wherein each of said bores is coaxially aligned to one of said plurality of lights.

25. A viewing system as set forth in claim 24 wherein each of said bores exhibits an oblong forward aperture.

26. A viewing system as set forth in claim 24 wherein said lens cover includes a plurality of etched lines that radially extend from the center of said lens cover and wherein said lines are aligned to diffuse light emitted from said plurality of lights.

* * * * *